United States Patent
Morris et al.

[11] Patent Number: 6,142,624
[45] Date of Patent: Nov. 7, 2000

[54] WIDE FIELD SPHERICAL LENSES AND SINGLE DESIGN SPECTACLE FRAMES THEREFOR

[75] Inventors: Michael Alan Morris, Santa Rosa, Calif.; Colin Maurice Perrott, Mount Barker; Simon J. Edwards, St. Peters, both of Australia; Ray Steven Spratt, Petaluma, Calif.

[73] Assignee: Sola International Holdings Ltd., Australia

[21] Appl. No.: 09/223,006

[22] Filed: Dec. 30, 1998

[30] Foreign Application Priority Data

Jul. 17, 1998 [AU] Australia ................. PP4748

[51] Int. Cl.⁷ .................. G02C 7/02; G02C 1/00
[52] U.S. Cl. .................. 351/159; 351/41; 351/158
[58] Field of Search .................. 351/159, 41, 177–178, 351/158, 43–44

[56] References Cited

U.S. PATENT DOCUMENTS

| | | | |
|---|---|---|---|
| 1,741,536 | 12/1929 | Rayton | 351/159 |
| 1,918,999 | 7/1933 | Wells | 351/159 |
| 3,526,449 | 9/1970 | Bolle et al. | 351/41 |
| 4,741,611 | 5/1988 | Burns | 351/44 |
| 5,094,520 | 3/1992 | Reshef et al. | 351/159 |
| 5,187,505 | 2/1993 | Spector | 351/159 |
| 5,208,614 | 5/1993 | Jannard | 351/41 |
| 5,517,260 | 5/1996 | Glady et al. | 351/169 |
| 5,648,832 | 7/1997 | Houston et al. | 351/159 |
| 5,689,323 | 11/1997 | Houston et al. | 351/41 |
| 5,764,332 | 6/1998 | Kranhouse | 351/43 |
| 5,861,935 | 1/1999 | Morris et al. | 351/169 |

FOREIGN PATENT DOCUMENTS

| | | |
|---|---|---|
| 0225034 | 6/1987 | European Pat. Off. . |
| 0446698 | 9/1991 | European Pat. Off. . |
| 0547762 | 6/1993 | European Pat. Off. . |
| 640523A1 | 3/1995 | European Pat. Off. . |
| 2688322 | 9/1993 | France . |
| 680400 | 10/1952 | United Kingdom . |
| 2281635 | 3/1995 | United Kingdom . |
| WO96/13236 | 5/1996 | WIPO . |
| WO 9721139 | 6/1997 | WIPO . |
| WO97/35224 | 9/1997 | WIPO . |
| WO97/41483 | 11/1997 | WIPO . |

OTHER PUBLICATIONS

M. Jalie, *The Principles Of Opthalmic Lenses*, pp. 1–27, 30–33, 151–152, 422–441, 462–468 (4$^{th}$ Ed. London 1994).

*Primary Examiner*—Scott J. Sugarman
*Assistant Examiner*—Jordan M. Schwartz
*Attorney, Agent, or Firm*—Burns, Doane, Swecker and Mathis LLP

[57] ABSTRACT

The present invention relates to novel ophthalmic lens elements and eyewear having wide field of view, low distortion, improved astigmatism correction where required and enhanced eye protection properties. Series of lens elements have steeply curved spherical reference surfaces. The edged lenses of the series have approximately consistent aperture size, shape and hollow depth across a range of common prescriptions.

54 Claims, 25 Drawing Sheets

A "Tscherning" ellipse

"ROTOID" Lenticular (after M. Jalie)

PRIOR ART

Morris - Spratt Diagram

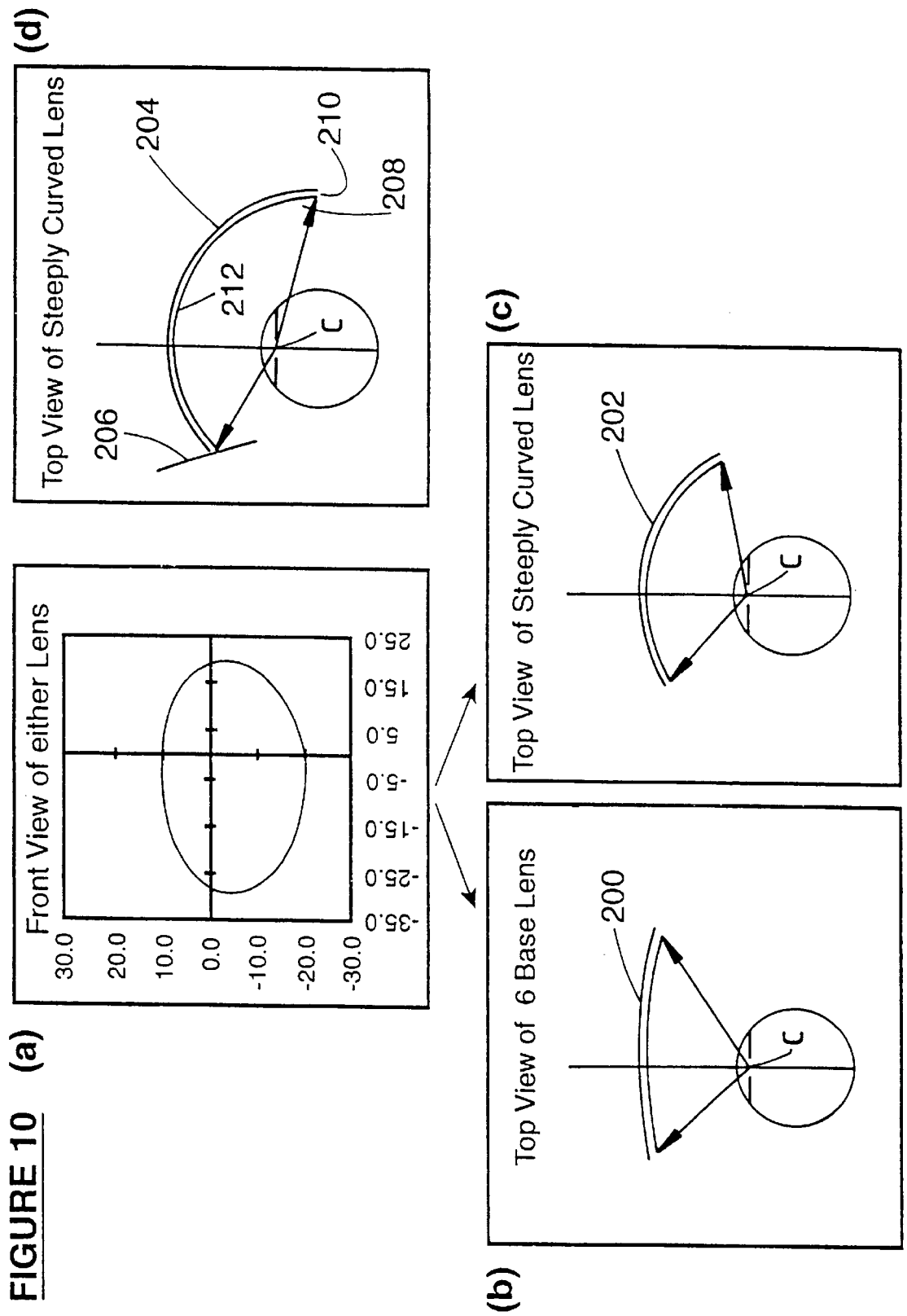

barrel surface astigmatism donut

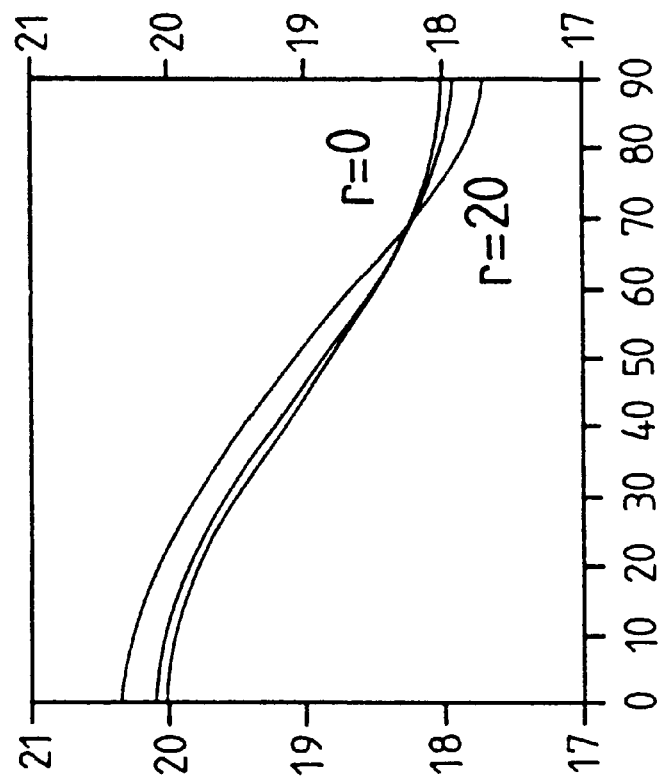
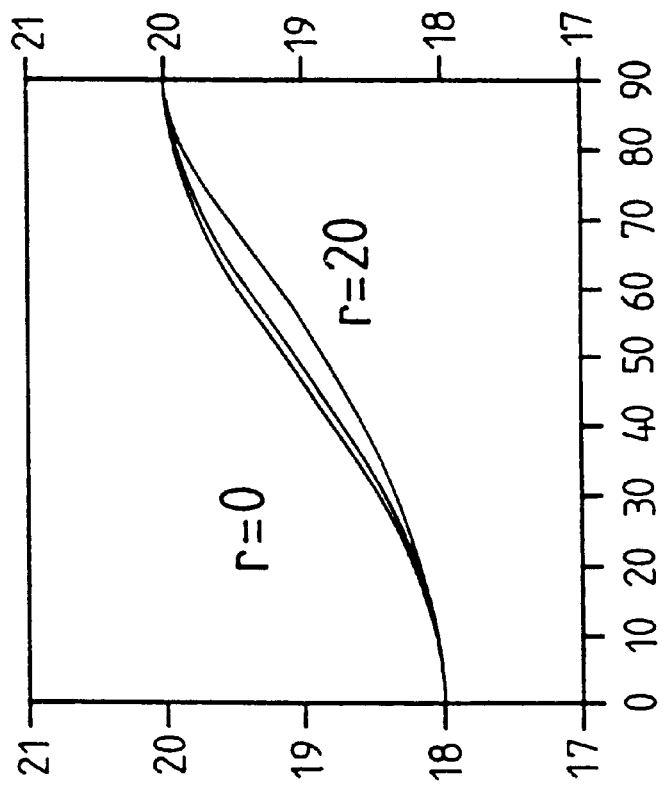

surface astigmatism circular meridians
one extra coef.

Object Grid

Image through -5.00 Conventional lens

Image through -5.00 Distortion Corrected Lens

| | 6 Base | Concentric Spherical Back |
|---|---|---|
| XL Progressive Rx=+2.00 D Distance Vision | | |
| Mean Power Error | 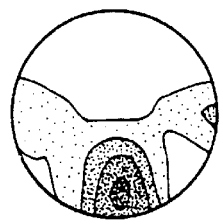 | 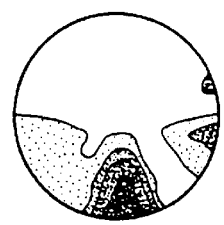 |
| RMS Power Error | 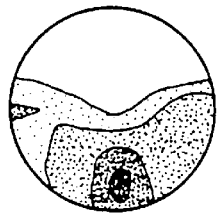 | 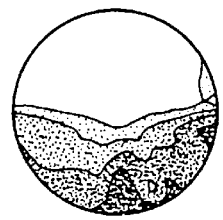 |
| Astigmatism | 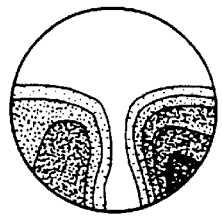 | 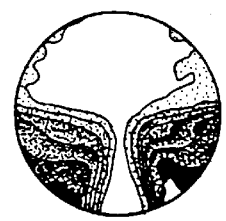 |
| Lens Form |  | |
| Lens Data | Progressive Front Spherical back Front=6.00 D @ 1:530 Rx=2.00 D Index=Poly | Progressive Front Spherical back Front=16.0 D @ 1.530 Rx=2.00 D Index=Poly |
FIGURE 21

| XL Progressive Rx=+2.00 D Near Vision | 6 Base | Concentric Spherical Back |
|---|---|---|
| Mean Power Error | 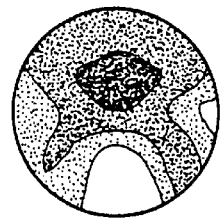 | 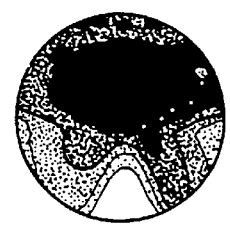 |
| RMS Power Error | 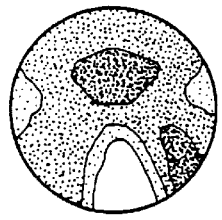 |  |
| Astigmatism | 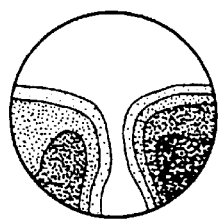 | 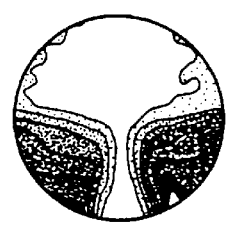 |
| Lens Form |  | |
| Lens Data | Progressive Front Spherical back Front=6.00D @ 1.530 Rx=2.00D Index=Poly | Progressive Front Spherical back Front=16.0D @ 1.530 Rx=2.00D Index=Poly |
FIGURE 22

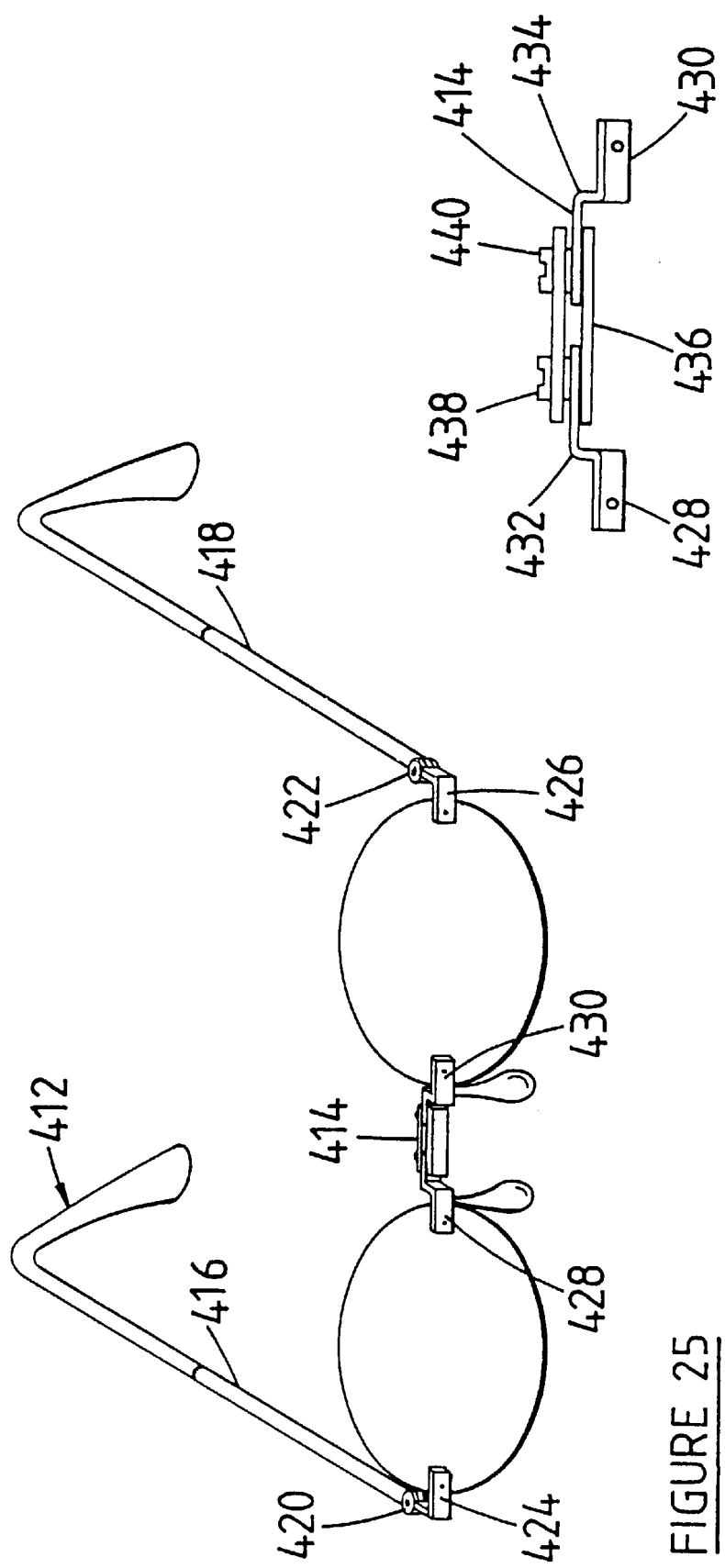

WIDE FIELD SPHERICAL LENSES AND SINGLE DESIGN SPECTACLE FRAMES THEREFOR

FIELD OF THE INVENTION

The present invention relates to improved ophthalmic lens elements and eyewear, including prescription lenses, spectacles, sunglasses, safety glasses and frames therefor.

BACKGROUND

Most conventional prescription lenses have relatively flat base curves. Such lenses provide a limited field of view due to peripheral distortion and/or physical size limitations. Their relatively flat shapes limit the amount of eye protection afforded by the lenses, particularly near the temples.

Wrap-around eyewear has been developed in an attempt to provide wider fields of view and greater eye protection. Wrap-around design also permits different and sometimes striking overall styles for the eyewear. However, wrap-around eyewear is typically non-prescription. These products also typically have flat base curves between 6 and 10 D. Wrap (and sometimes rake) are achieved by rotating and/or translating the optical axes of the lens in the as worn orientation. See e.g. U.S. Pat. No. 1,741,536 to Rayton; U.S. Pat. No. 5,689,323 to Houston et al. This causes the line of sight of the wearer to deviate from the optical axis, and optical performance is often significantly degraded. Peripheral vision is typically poor.

Early in the history of ophthalmic science, steeply curved prescription lenses had been described, although not as vehicles for providing greater field of view or eye protection. A relationship between curvature and through power is shown in the so-called "Tscherning's" ellipse. First described nearly 100 years ago, it attempts to identify combinations of lens curvature and lens power which have minimum abberation. The general form of the Tscherning ellipse is shown in FIG. 1. FIG. 1 is given for assumed typical values for lens parameters such as index of refraction, vertex distance, lens thickness, etc. The Tscherning ellipse retains its ellipsoid shape and inclined orientation for various assumed values of lens parameters, while the precise location of points on the ellipse may change. The ellipse of FIG. 1 is derived from the corrected von Rohr equation (after Morgan) solved for point-focal (zero astigmatism) distance vision.

The lower portion 10 of the ellipse is the so-called "Ostwalt section" which describes a selection of relatively flat front surfaces for lens powers typically used in conventional prescription ophthalmic lenses. The upper portion 12 of the curve, called the "Wollaston section", describes much more steeply curved lenses which have never gained acceptance as lens forms, although there are historical instances of attempts to make such objects (e.g. Wollaston himself). See, M. Jalie, *The Principles of Ophthalmic Lenses* p. 464 (4t Ed. London, 1994). Because of difficulties in fabrication, such early lenses were probably of small aperture and, consequently, perhaps, regarded as unacceptable for cosmetic reasons and because of their limited field of view.

Modern lenses with steeply curved front spherical surfaces have been made for the treatment of aphakia (absence of the natural lens of the eye as in the case of surgical removal of the lens). The general form of these lenses is shown in FIG. 2. See M. Jalie at p. 151. Such lenses serve essentially as an eye lens replacement and are characterized by great thickness and high plus power (greater than +5 D and typically +12 D or greater). The aperture A of these lenses are of small size e.g. 26 or 28 mm in diameter. Typically such aphakic lenses have a plano radial flange 14.

Today, the vast majority of conventional prescription lenses are relatively flat, single vision, Ostwalt section, miniscus lenses which are glazed like window panes into flat outline spectacle frames.

OBJECTS AND ADVANTAGES OF THE INVENTION

Applicants have studied the properties of steeply curved lenses and considered series of lenses having commonly prescribed plus or minus through powers. Applicants observed that such lenses could, in principle, provide a wide field of view and eye protection. However, certain problems would interfere with practical implementation of such wide-field lens. Generally there are problems of fabrication and distortion, and problems of producing a range of common plus or minus power prescriptions with or without available common astigmatism correction or "cy 1" prescriptions.

A more subtle problem is presented by the wide range of front surface powers which would be required to provide a range of common prescription powers. For the lens assumptions of FIG. 1, for example, the Wollaston section would be understood to teach a variation in front surface power of from about 15 D to about 20 D for a product line through-power range of from +5 D to −8 D. This corresponds to a variation in radius of front surface curvature of from about 29 to about 39 mm, which represents a large variation in overall size and shape for lenses large enough to provide a wide field of view. Such lens cannot be fitted like panes into a single frame size, but, in fact, each prescription itself would dictate its own specialized frame size and style. While such unique styles have value, they are incompatible with providing mass-marketed eyewear with a consistent appearance.

A broad object of the present invention is to provide ophthalmic lenses with good vision properties.

It is another object of the present invention to provide a series of steep base curve lenses which are readily manufactured and dispensed.

It is another object of the present invention to provide an ophthalmic lens having good vision properties through a wide field of view.

It is another object of the present invention to provide a steeply curved lens with reduced distortion in peripheral regions.

It is another object of the present invention to provide eyewear which affords more effective eye protection.

It is another object of the present invention to provide steeply curved lenses in common power and astigmatism prescriptions.

It is another object of the present invention to provide eyewear for steeply curved prescription lenses with a consistent appearance and frame configurations for a range of prescriptions.

Certain additional advantages may be realized through the teachings of the present invention. The increased field of view allows the making of eyewear whose temporal edge is not visible to the wearer (apparent edgelessness). The teachings of the present invention also permit reduction of magnification effects and associated distortion in some steeply curved lenses.

Other advantages involve providing the eyewear designer with options heretofore unattainable in lens having good peripheral vision properties in various prescriptions. These include the ability to use smaller outline lenses, topologically and cosmetically interesting three-dimensionally curved lens edges and spectacle rims, and edge thicknesses which are more readily hidden from view, particularly in the temporal region.

These and other objects and advantages will be apparent from the following text and drawings.

SUMMARY OF THE INVENTION

Generally, the present invention relates to eyewear and ophthalmic lens elements therefor. Ophthalmic lens elements may include, according to context, finished or edged ophthalmic lenses, semi-finished lenses, lens blanks or molds therefor. Also included are wafers for forming laminated lenses or lens blanks.

The present invention is exemplified with reference to FIG. 3 which illustrates some geometric aspects of the steeply curved, concentric lenses of the present invention. FIG. 3 shows a horizontal cross-section of left and right eyes (20 and 22 respectively). Each eye is shown having a centroid of rotation, 24 and 26. The centroid of rotation may be understood as a volume within the eyeball, having a diameter $C_D$ of roughly 1–2 min, about which the eye appears to rotate as the direction of gaze varies. As shown in FIG. 3, left and right steeply curved lenses 28 and 30 are positioned about the eye. In the Figure, the optical axis of each lens is co-linear with the line of sight of each eye and represented by the lines 32 and 34 for each eye. These lines also represent the z axis of coordinate systems later used in the text to describe certain lens surfaces (the x-y plane being normal to the plane of the Figure).

The lenses 28 and 30 are generally describable as spherical or spherically based. In preferred embodiments, the front surface is spherical, having a fixed radius of less than 35 mm for all prescription values in the series. In other embodiments, the lens is best described as having a spherical back, as containing a reference sphere or as lying within a defined spherical shell. In each case the radius of the reference sphere or shell and the location of the lens as worn is such that the center of the reference sphere or shell lies close to or within the centroid of rotation of the eye. The case in which the front surface is a sphere of radius R centered on the centroid of rotation of the left eye is illustrated for the left eye in FIG. 3.

The selection of a spherical base of a given radius centered on or near the centroid of rotation of the eye, places a constraint on the vertex distance $d_v$, illustrated for the left eye of FIG. 3 as the distance between the plane of the pupil 36 and the back surface 38 of the lens. Front surface radius and back surface shape, in conjunction with other design parameters such as the lens thickness and the index of refraction of the lens material determines the optical properties of the lens as described in detail below.

Applicants have found that the lens design of the present invention may be analyzed and described by a data array of a type illustrated in FIG. 4. The diagram is called a "Morris-Spratt" diagram after two of the inventors.

In the diagram, each dot is at the center of a theoretical ray-trace plot from a lens having properties of the grid point at the center of the dot. The "y" axis on the right gives the power of the front surface of the lens in diopters (normalized for an index of refraction of n=1.530). The "x" axis at the bottom shows the through power of the lens at its center. This corresponds to the plus or minus power prescription of the lens. For this Figure it is assumed that each lens is made of polycarbonate (n=1.586) and has a center thickness of 1.8 mm in minus power lenses, and a center thickness in plus lenses determined individually for each prescription so that the minimum overall lens thickness is 1 mm in the periphery of a 58 mm diameter lens blank. Each lens is positioned relative to the eye such that the front surface is 33.1 mm from the centroid of rotation of the eye, which is concentric for lenses which have a front surface power of 16.0 diopters.

At each individual grid point appears a ray trace result for eye rotation angles up to 40 degrees. The dark area at each grid point represents the region of each lens that has less than 0.125 diopters of RMS power error relative to the prescription and allowing up to 0.375 diopters of accommodation. RMS power error is defined mathematically below. This criterion is believed to be a good indicator of lens performance.

The fully filled-in circles in FIG. 4 represent lenses with less than 0.125 diopters of RMS power error over 40 degrees of eye rotation in any direction. For dots with rings around them, the RMS power error rises above 0.125 diopters for some intermediate eye rotation angles then drops below that threshold again for some small angular region.

The elliptical outline of the locally largest dots corresponds roughly to a Tcheriing's ellipse generated for the special case of the lens parameters selected by applicants. Conventional wisdom dictates that the front surfaces of spherical lenses (lenses with spherical surfaces on the front and back) must follow Tcherning's ellipse to produce high quality lenses. However, the Morris-Spratt diagram illustrates that for appropriate selection of lens parameters there is a nearly horizontal region in this diagram where it is possible to produce excellent lenses. It is known that plano spherical lenses with high quality optics can be fabricated extending over a wide range of front surface curvatures (a fact that indicated by the vertical line of large dots near zero through power). Many such lenses are available in the market today. The novel idea that is illustrated in the Morris-Spratt diagram is that is it also possible through appropriate selection of lens parameters to fabricate high quality spherical lenses over a wide range of prescriptions using a single, steeply curved front surface or spherical reference surface or shell. Notice that the low RMS power error regions for lenses using a front surface power of 16 diopters (grid points on line 40) have wide angular extent (nearly full or full circles) over a range of at least −6 to +4 diopters. Over 95% of all prescriptions fall within this range. Therefore, it is possible to produce high quality ophthalmic spherical lenses over a wide range of useful prescriptions using a single, appropriately selected high power front surface or base curve. Moreover, as made clear by FIG. 4, some small deviations from the single power or from exact concentricity may be made while providing good lens quality and a lens shape sufficiently consistent to use the same frame style.

FIG. 5 illustrates a series of good optical quality lenses of a preferred embodiment of the present invention. In this embodiment, the front surface is selected to be about 16 D ± about ½ D. This range lies between lines horizontal 50 and 52. Particularly preferred embodiments provide series of lenses having prescription in the range −2 D to +2 D (area 54), −6 D to +4 D (areas 54 and 56), or −8 D to +5 D (areas 54, 56 and 58).

For comparison purposes, a portion of the Wollaston section of the Tscherning ellipse 60 for this special case has been overlaid on the diagram of FIG. 5. The Figure shows that the front curve and through power ranges represented in the horizontal blocks are inconsistent with the Tscherning ellipse teaching which would indicate a 5 D variation in the front surface for −8 D to +5 D through power and a far steeper curvature in the center of the through power range.

Preferred embodiments of the present invention include series of lens elements defined by a single reference sphere concentric with the centroid of rotation of the eye of the wearer, where the sphere has a radius of curvature in the range of 25 to 50 mm, more preferably 30 to 35 mm and most preferably about 33 mm ± about 1 mm.

Advantageously, the series of lens elements are provided with the appropriate prescribed power and cyl correction. In the embodiment where the front surface is spherical, the back surface is configured to provide the appropriate through power and cyl correction. In a preferred embodiment, a series of lens elements would include through power through the above-mentioned ranges in ¼ D increments. Stock lens elements of each power would be provided with each of various common astigmatism prescriptions, for example, 0 D to −2 D in ¼ D increments. It will be understood that because of the spherical symmetry of the lens element, the angle of the cyl correction can be selected by appropriate rotation of the lens element during edging and glazing.

Conventional astigmatism correction is based on toroid surfaces often described in terms of principle meridia, i.e. orthogonal meridia centered at the optical axis of the lens, representing the locus of maximum and minimum curvatures. Barrel toroids and donut toroids have both been used to provide cyl corrections. As described below, applicants have developed novel astigmatism correcting surfaces for steeply curved lens, which surfaces can be described as lying between a barrel toroid and donut toroid each having the same principle meridia and the same power along the principle meridia. Two such surfaces are the "all-circular meridia" surface and the "averaged-toroids" surface described in detail below.

The shape of lenses of the present invention will now be described. The term "steep curvature" is used in this context to describe the overall shape of the lens or reference sphere or shell. In particular examples the curvature may be quantified as an average radius of curvature of a surface or of a spherical shell lying inside or outside the lens or containing a surface of the lens.

Lenses of the present invention are also characterized in general shape by their large angular field of view, often expressed as an angle between the optical axis and the temporal-most or nasal-most extremes of the edges. In accordance with preferred embodiments of the present invention, the lens subtends an angle centered on the center of a front spherical surface, the angle being greater than 80° and in preferred embodiments greater than 100°. It will be understood that such angles are indications of the field of view of the lens provided of course that the lens is optically usable in these peripheral regions.

The unique topological shape of the lenses of the present invention may also be characterized by sagittal depth or "hollow" depth, which are generally a measure of the three-dimensionality of the lens and lens edge. These depths relate to the distance between the fronto-parallel plane of the lens and the temporal most edge point, as described below. In accordance with preferred embodiments of the present invention, there are provided lenses with an average radius of no more than 50 mm centered on the centroid of rotation of the eye and having a hollow depth of at least 8 mm. In a particularly preferred embodiment the radius of the front surface is about 33 mm ± about 1 mm and the hollow depth is at least 10 mm.

The present invention also includes methods for providing prescription eyewear. These methods employ lens elements having a steep curvature. Preferred embodiments employ a front surface which lies within a spherical shell of a thickness no greater than 2 mm and a radius of no more than 50 mm. A rear surface is formed in the lens element so that the lens element has a prescribed through power and a prescribed astigmatism correction. The lens element is positioned on the wearer so that the center of the spherical shell lies at or near the centroid of the eye by glazing into a frame having a standard aperture corresponding to a radius of a spherical shell common to a series of lens elements having different through power, including the prescribed through power. The eyewear provides the prescribed power and astigmatism correction through the wearer's entire visual fixation field.

The present invention also includes specially designed spectacle frames. In a preferred embodiment the spectacle frame is suitable for use with a series of ophthalmic lenses, each having a spherical surface of a single radius between 25 and 35 mm, and a second surface selected to provide in conjunction with the spherical surface various common prescriptions. In preferred embodiments the frame is adapted to support left and right lenses on the wearer so that the centers of the spherical surfaces are located at or near the centroids of rotation of the left and right eyes, respectively. The spectacle frame may include temple pieces and rim portions for engaging the left and right lenses. The rim portion engaging each lens may be formed in the shape of a closed curve lying on a reference sphere having a radius approximately equal to the radius of said spherical surface. In such spectacle frames, the nasal-most point and temporal-most point of the closed curve may subtend an arc of greater than 90° with a vertex at the center of the spherical surface.

The spectacle frames may include a left temple piece, a right temple piece and a nose bridge. In a preferred embodiment the nose bridge is of adjustable length to allow horizontal adjustment of the lens separation to position the centers of the spherical surfaces at the centroids of the eyes. In other embodiments, rimless frames are provided with hinges for supporting temple pieces, the hinges being adapted for direct attachment to the reference spherical surface at the temporal edges of the respective lens.

The foregoing is intended only as a summary of the invention, the scope of the invention being determined by the literal language of the claims and equivalents thereof.

BRIEF DESCRIPTION OF THE DRAWINGS

FIGS. 10(a), 10(b), 10(c) and 10(d) present comparison of fields of view for an example of a 6 base conventional lens and a lens and lens element of the present invention;

FIGS. 13(a), 13(b), 14(a) and 14(b) are graphs of tangential and sagittal surface power as a function of polar angle for the all-circular meridia and the averaged toric surfaces of the present invention;

FIGS. 21 and 22 are contour plots comparing a conventional 6 D base progressive lens, with a 16 D base progressive lens in accordance with the present invention;

FIGS. 23, 24, 25 and 25(a) illustrate various aspects of the appearance, edging, and glazing of lens elements of the present invention and spectacle frames for use therewith.

DETAILED DESCRIPTION OF DRAWINGS AND EXAMPLES

OUTLINE

I. Basic Lens Geometry.
II. Correction Of Astigmatism.
III. Reduction Of Magnification Effects And Distortion.
IV. Lens Manufacture.
V. Calculated Performance Of Lens Design Examples.
VI. Glazed Lenses And Spectacle Frames.

I. Basic Lens Geometry

Figure 6:
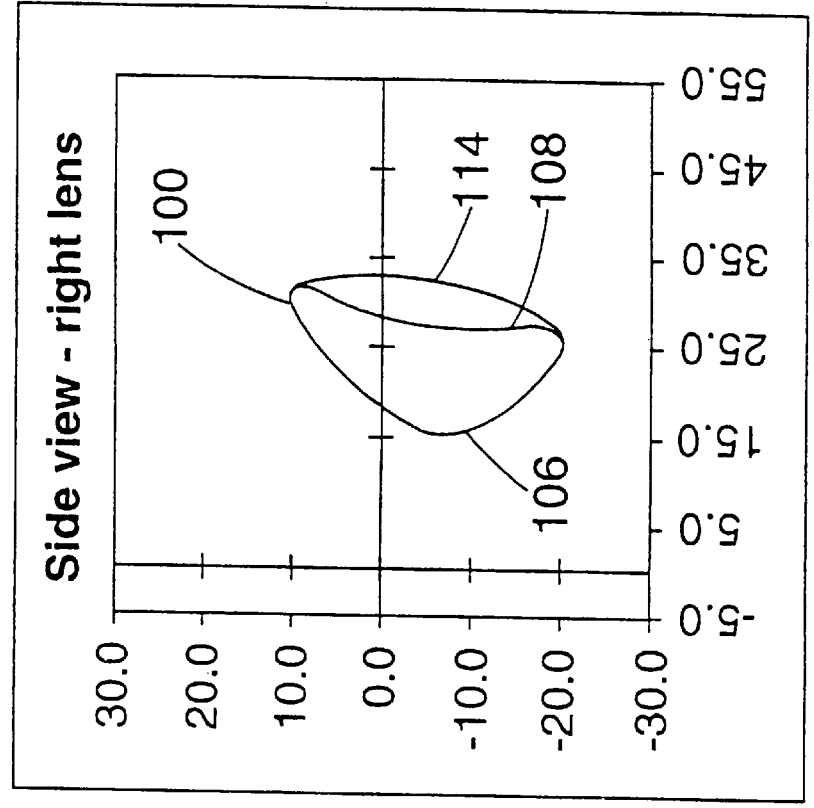
FIGS. 6(a), (b) and (c), 7, 8 and 9 are schematic diagrams illustrating various aspects of the geometry of lens elements of embodiments of the present invention.
Figure 6:
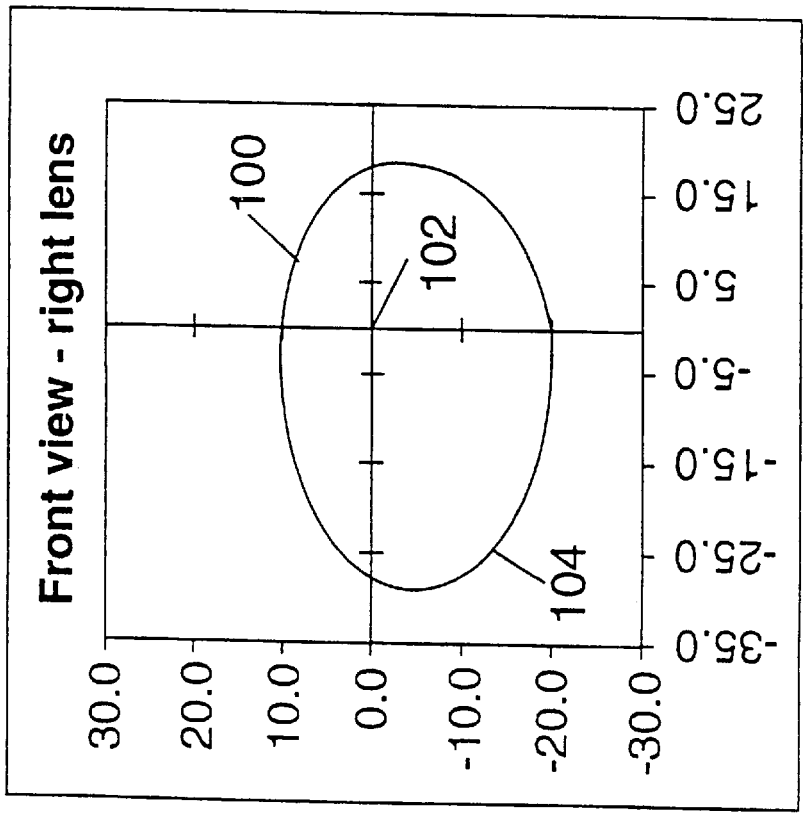
Figure 6:
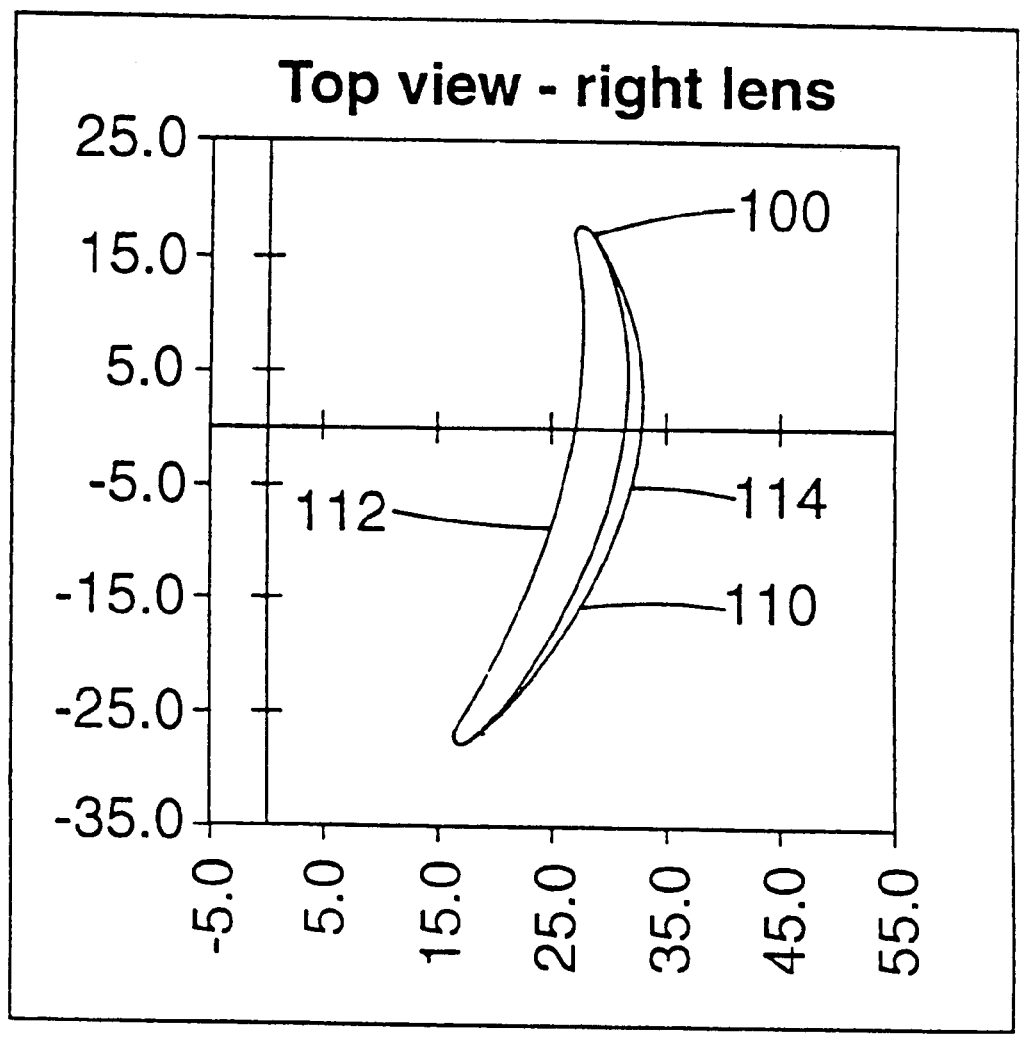

The basic geometry of lenses made in accordance with the present invention will first be discussed. FIGS. 6(a), 6(b) and 6(c) illustrate, respectively, front, side and top views of an edged lens 100 in accordance with the present invention. The origin 102, in FIG. 6(a), is the location of the optical center of the lens and the design location of the center of the pupil when worn. The outline 104 of the edged lens is indicated from a front view perspective in FIG. 6(a). In FIG. 6(b) the temporal edge 106 and nasal edge 108 of the lens are shown. In FIG. 6(c) the upper edge 110 and lower edge 112 of the lens are shown. In the lens embodiment of FIG. 6, the front surface of the lens is a steep spherical curve, the right-most extent of which is indicted by the line 114.

The steeply spherical curvature of embodiments of the present invention can be designed into the lens in a variety of ways. In the preferred embodiment, discussed above, the front surface of the lens elements is a single radius sphere centered at or near the centroid of rotation of the eye. Alternatively, the back surface of the series of lens elements may be a constant steeply spherical surface and centered at or near the centroid of rotation. In these embodiments the other surface is of variable curvature, the curvature being selected to provide at least the appropriate through power for the wearer. For example, if a 16 D spherical front surface is selected for the lens element series, a rear surface with a curvature of 20 D on its major meridian and 18 D on its minor meridian may be used to provide a −4 D through power with a −2 D cyl. Alternatively, if the constant radius surface of the lens element is placed on the back surface, then the corresponding surface selected for the particular prescription may be placed on the front surface.

Figure 7:
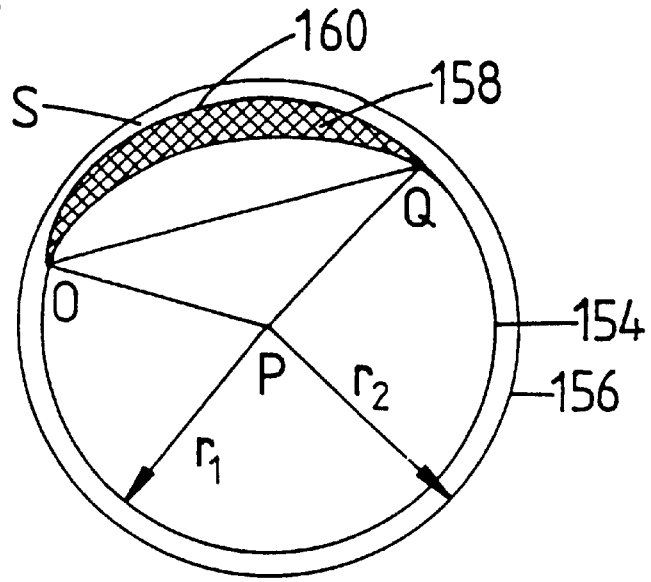

In other alternatives, the lens element or a surface is constrained to lie within a spherical shell. This geometry is illustrated in FIG. 7. Two concentric spheres, 154 and 156 are defined by a center at Point P and two radii $r_1$ and $r_2$ where $r_2 > r_1$. Together, the spheres define a shell S. A lens 158 is shown having a nasal-most edge point Q and a temporal-most edge point O. A front surface 160 of the lens lies within the shell S.

A front surface of the optical lens element according to the present invention may be a spherical, toric or rotationally symmetric aspheric surface. In order to improve vision further, the front and/or back surface of the optical lens element according to the present invention may deviate from a spherical form to provide improved optical performance and/or cosmetic appearance. The front and/or back surface, as described above, may be derived by the solution of the optimization problem to minimize a selected merit function representing a measure of optical abberations seen by the wearer of the lens. The correction may alternatively, or in addition, improve the cosmetic appearance of the lens element. Alternatively the surface within the shell may be a multi-focal progressive lens as described in greater detail below.

In a preferred embodiment, the lengths of radii $r_1$ and $r_2$ differ by no more than 2 mm, and in a more preferred embodiment one of the radii is about 33 mm and the difference in the lengths of the $r_1$ and $r_2$ is about 0.1 mm or less. The front surface subtends an angle OPQ greater than 75°, preferably greater than 90° and more preferably greater than 1000. This angle is a measure of the wide field of view provided by the lens.

Alternatively, the lens may be defined to lie entirely within a shell defined in a manner similar to the shell S of FIG. 7, where the difference in length of $r_1$ and $r_2$ is less than 6 mm.

Additionally and alternatively, the lens may be defined as containing a portion of a steeply curved sphere such as the portion OQ of the sphere having radius $r_1$ in FIG. 7. The reference sphere may be a sphere which lies intermediate the front and back surfaces of the lens element. In embodiments of the present invention this steeply curved sphere may define abutting surfaces of two lens wafers otherwise made in accordance with U.S. Pat. No. 5,187,505 which is hereby incorporated by reference. In such a case the ophthalmic lens or lens blank is formed as a laminate of back and front wafers. Because the abutting surfaces of the wafers are spherical, it will be understood that the wafers may be rotated to achieve the desired orientation of a cyl correction applied to one of the surfaces. This is particularly useful in providing progressive lenses.

Figure 8:
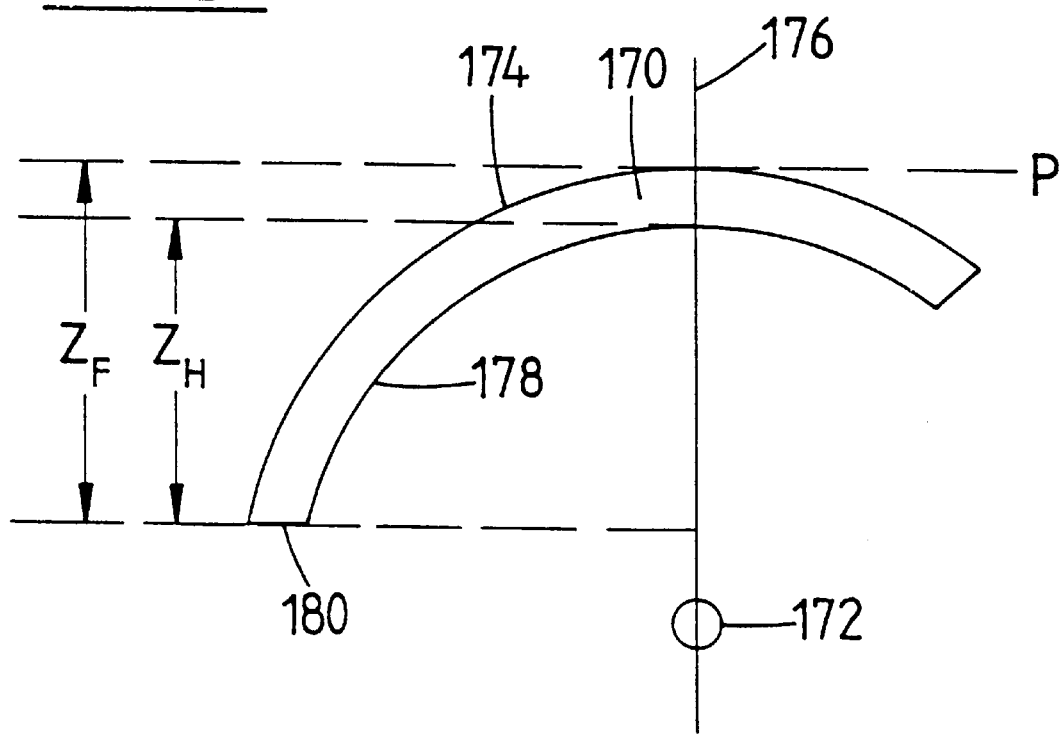

Other aspects of the novel geometry of the lens elements of the present invention are illustrated in FIG. 8. A lens 170, with a steep spherical curvature, approximately concentric with the centroid 172 of rotation of the eye, is shown. The fronto-parallel plane P is tangent to a spherical front surface 174 of the lens. The optical axis 176 of the lens is normal to the plane P and passes through the centroid of rotation of the eye. A back surface is identified by the numeral 178. The lens extends in a temporal direction to a temporal edge 180. The novel geometry of the lens is defined in part by a hollow depth $Z_H$ which is the perpendicular distance between the back surface 178 of the lens at the optical axis and the edge 180. A related dimension $Z_F$, is the distance between the fronto-parallel plane P and the edge 180.

Figure 9:
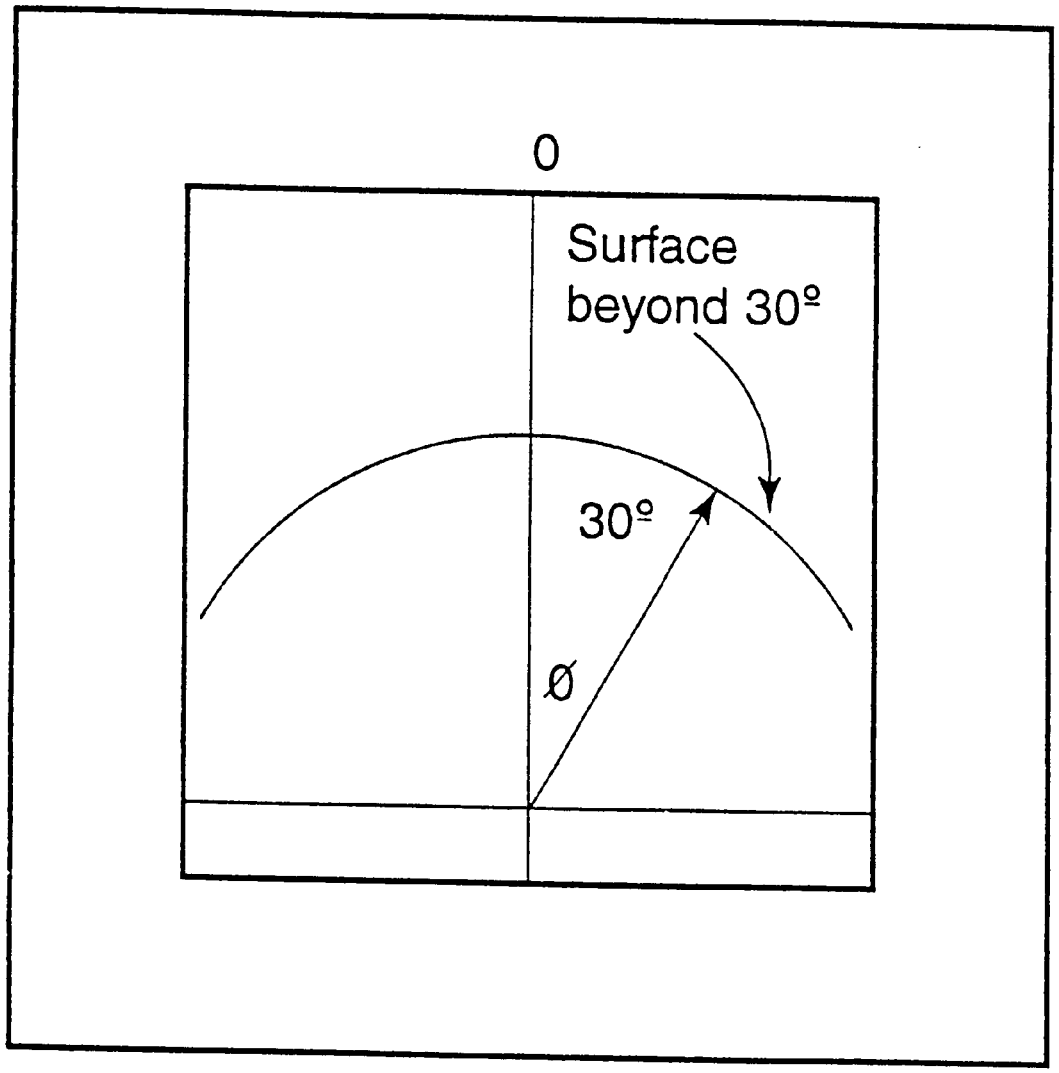

It is instructive to consider the peripheral optical properties of the lenses of the present invention, such as distortion. In such cases, reference may be made as shown in FIG. 9 to lens properties lying inside or outside of a cone of half angle φ centered on an optical axis O. In FIG. 9, θ is shown as a 30° angle. In preferred embodiments of the present invention, the lens element of the series has a surface astigmatism of less than 0.125 D through a cone defined by an angle θ of at least 25°.

A lens element of the present invention may be such that for foveal vision the RMS Power Error (defined below) is less than ⅜ D for eye rotation angles less than 30°. Moreover the lens element may be such that for foveal vision the RMS Power Error is less than ½ D for eye rotation angles greater than 30° and less than 40°. Finally, the lens element may be such that for foveal vision the RMS Power Error is less than ¾ D for eye rotation angles greater than 40° less than 50°.

In preferred embodiments, the lens element may be configured such that for peripheral vision where the eye is rotated and fixated at an angle of 30° temporally the RMS Power Error is less than ⅜ D for angles ±5° of the fixed position; the RMS Power Error is less than 0.65 D for angles ±10° of the fixed position; and the RMS Power Error is less than 1.0 D for angles ±30° of the fixated position.

Certain features of the present invention and a comparison with a conventional lens are illustrated in FIG. 10. FIG. 10(a) illustrates a plan view outline selected for a conventional lens and a steeply curved spherical lens of the present invention. A conventional 6 D base lens 200 is shown in FIG. 10(b) and a 16 D base lens 202 in accordance with the present invention in FIG. 10(c), both having the same plan outline as in FIG. 10(a). The apparent field of view is measured between edge rays centered on the center C of the pupil in the pupillary plane. The conventional base 6 lens 200 has an apparent field of view of about 105° while the lens 202 has an apparent field of view of about 130°. If a larger lens blank and plan outline are employed, a 16 D base lens 204 of the approximate size of FIG. 10(d) may be produced. Such a lens may extend horizontally from the nasal margins 206 to the temporal margins 208 of the orbital region producing an apparent field of view of about 170°. Such a lens would have no temporal edge which could be seen by the wearer when gazing straight ahead. Moreover, the temporal lens edge thickness 210, would not be readily observed by other people because it curves in a posterior direction, thus improving the cosmetic appearance of the lens. Finally, the rear surface 212 of the lens would clear eyelashes of normal length for a broad range of prescriptions.

II. Correction Of Astigmatism

Steeply curved spherical lenses in accordance with the present invention present particular problems when a cyl correction is part of the wearer's prescription. Common toric back surfaces may not provide acceptable performance. In particular, conventional torics do not work very well at the periphery of steeply curved lenses.

The ideal back surface for a cyl Rx (neglecting things like ray obliquity) would have a constant surface astigmatism appropriate for the prescription. No such surface exists. Toric surfaces are a manufacturable approximation to this ideal. There are two standard types of toric surfaces, sometimes referred to as donut torics and barrel torics. Each is made by sweeping a circular arc around a fixed axis. If the radius of the circle is smaller than its maximum distance to the fixed axis then it is a donut toric, otherwise it is a barrel toric. Both types of torics have circular cross sections along the two principal meridians. Because of this (and symmetry) the tangential power is correct everywhere along these meridians. In addition each type of toric has a "preferred" meridian where the sagittal power is correct. For the donut toric it is the lower tangential power meridian, for the barrel toric it is the higher tangential power meridian. Zero tangential and sagittal errors means the surface astigmatism is identically zero along the preferred meridian.

Figure 11B:
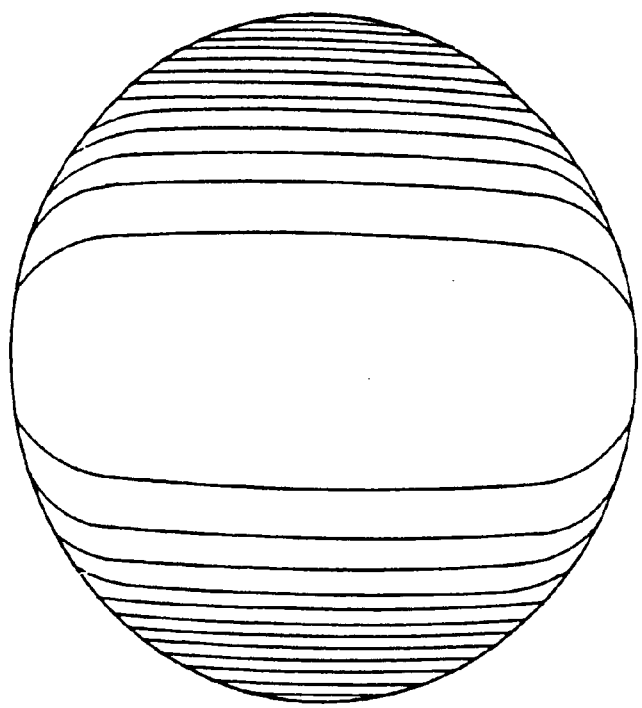
FIGS. 11(a) and (b) illustrate surface astigmatism of a conventional donut and a barrel toric when imposed on a steeply curved spherical lens having principle meridia shown in FIG. 11(c)
Figure 11A:
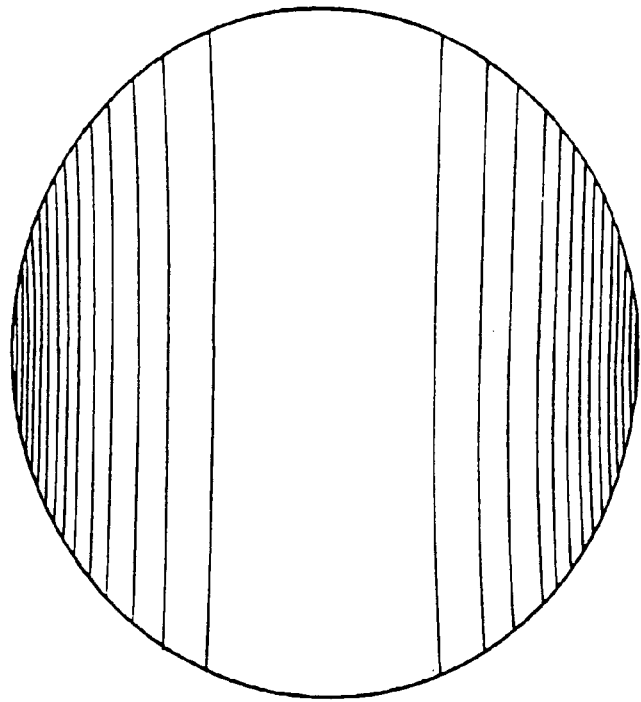
Figure 11C:
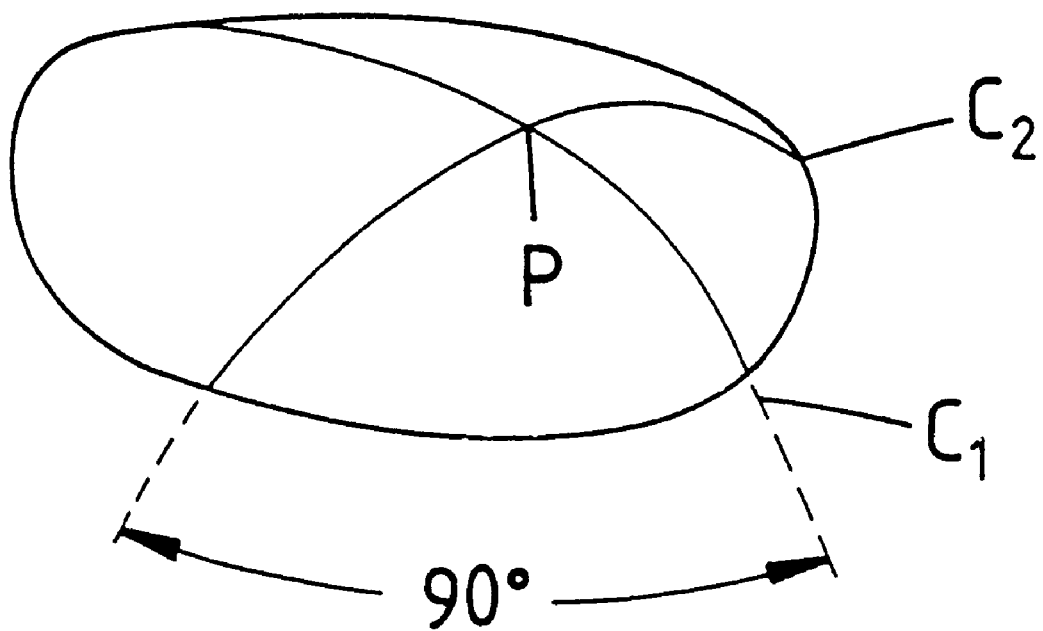
Figure 12B:
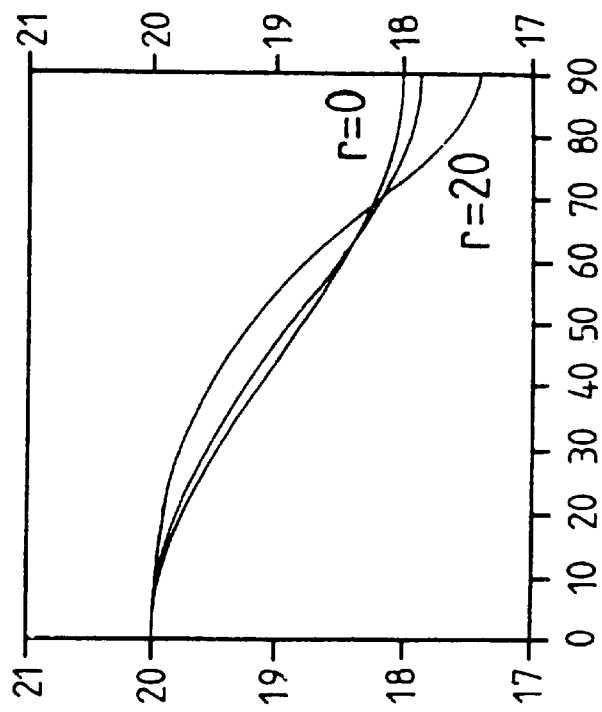
FIGS. 12(a)–(d) are graphs of tangential and sagittal surface power as a function of a polar angle for the donut and barrel torics of FIG. 11.
Figure 12A:
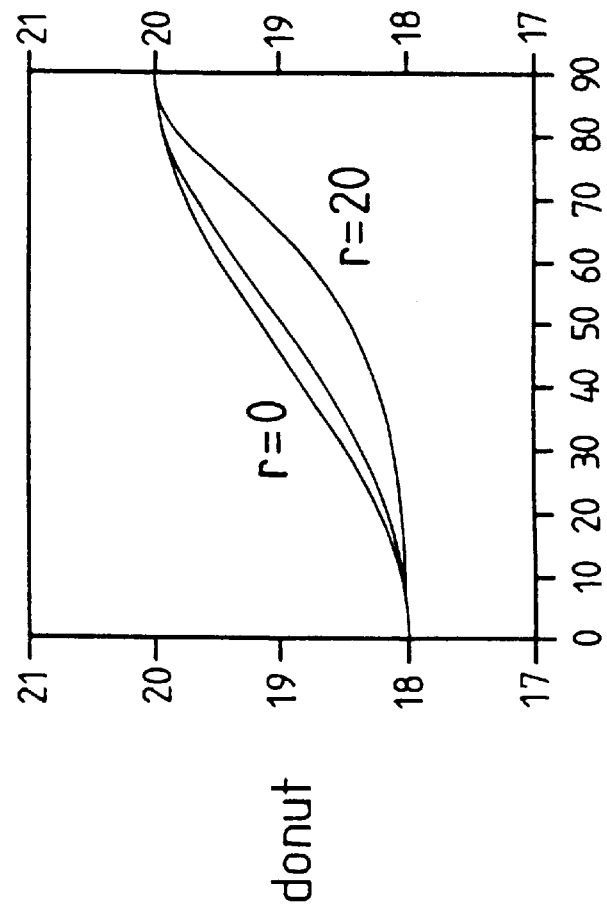
Figure 12D:
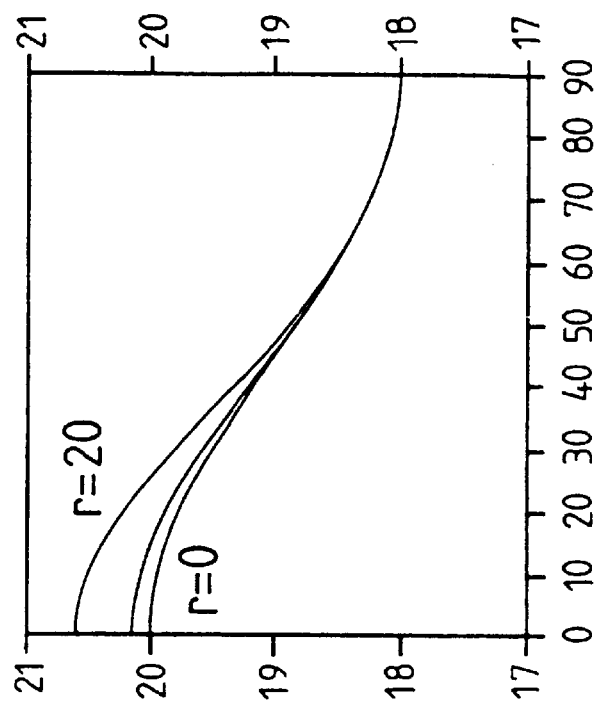
Figure 12C:
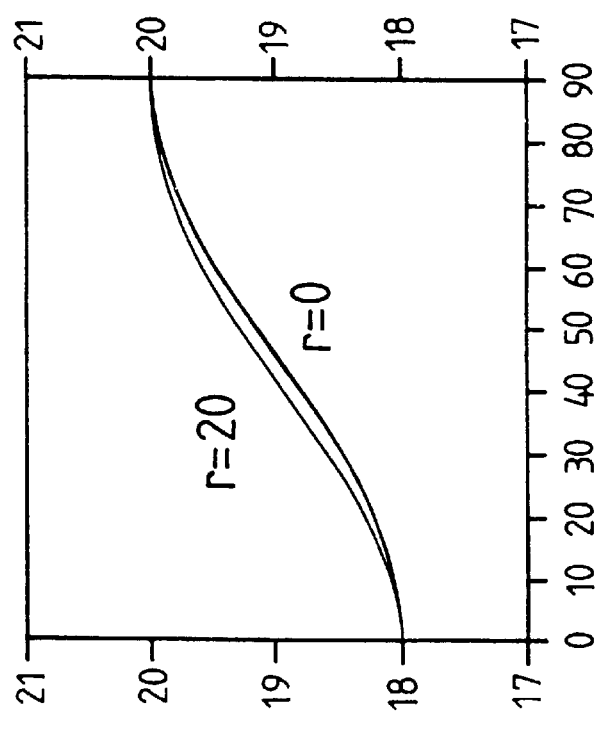

Examples of conventional torics in steeply curved lenses are shown in FIGS. 11(a) and (b). Both examples have a tangential power of 18 diopters (@n=1.530) on the equatorial 180 degree meridian and 20 diopters at 90 degrees, for a nominal 2 cyl. The plots are 45 mm in diameter and have 0.1 diopter contours. Circular principle meridional curvatures C1 and C2 are shown pictorially in FIG. 11(c). C1 and C2 intersect at a central point at the pole P at an angle of 90°. It will be understood that other "non-principle" meridia may be defined radiating from the central point.

The preferred axis is obvious from the plots of FIG. 11. The tangential and sagittal surface power for angles 0 to 90 degrees around radii 0, 10, and 20 mm from the center are shown in FIGS. 12(a)–(d).

From the Figures it may be noted that the donut and barrel torics both have the correct tangential power at 0 and 90 degrees for all radii. The donut toric has the correct sagittal power at 0 degrees, but an error at 90 degrees that increases with radius. The barrel toric has the correct sagittal power at 90 degrees and errors that increase with radius at 0 degrees.

There is something obviously asymmetrical about both of these torics; they each have a preferred meridian. There are, however, functions that preserve the correct tangential powers along the main meridians but treat the sagittal powers more symmetrically. One way to construct a function with the desired tangential behavior is to force the cross section along every meridian to be circular. The function would have the form $$z(r, \theta) = R(\theta) - \sqrt{R(\theta)^2 - r^2}$$

Where R(θ) is the radius of curvature along the θ Meridian, and $$r = \sqrt{x^2 + y^2}.$$

Figure 13B:
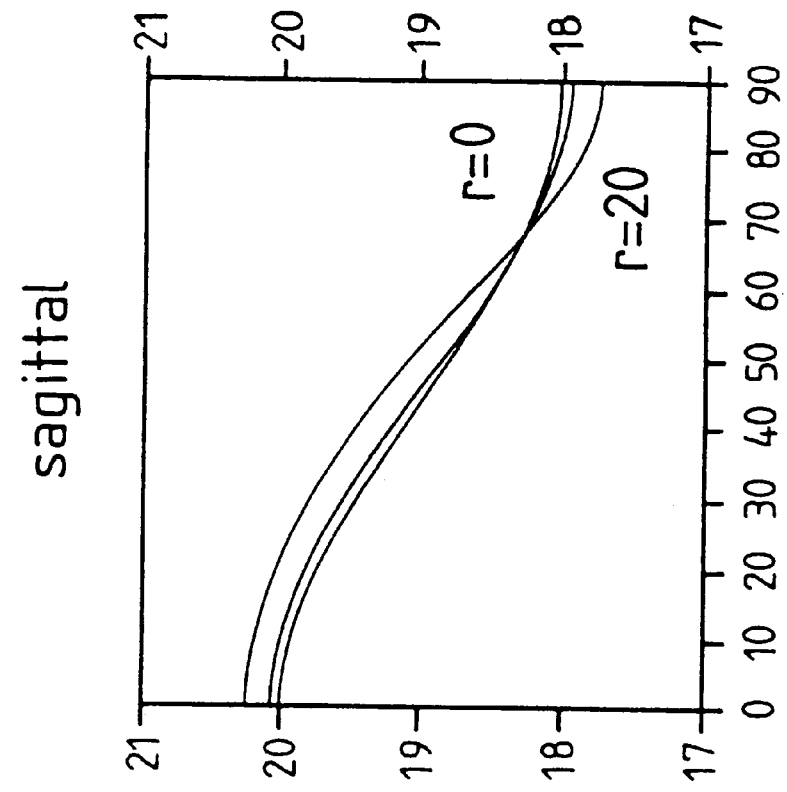
Figure 13A:
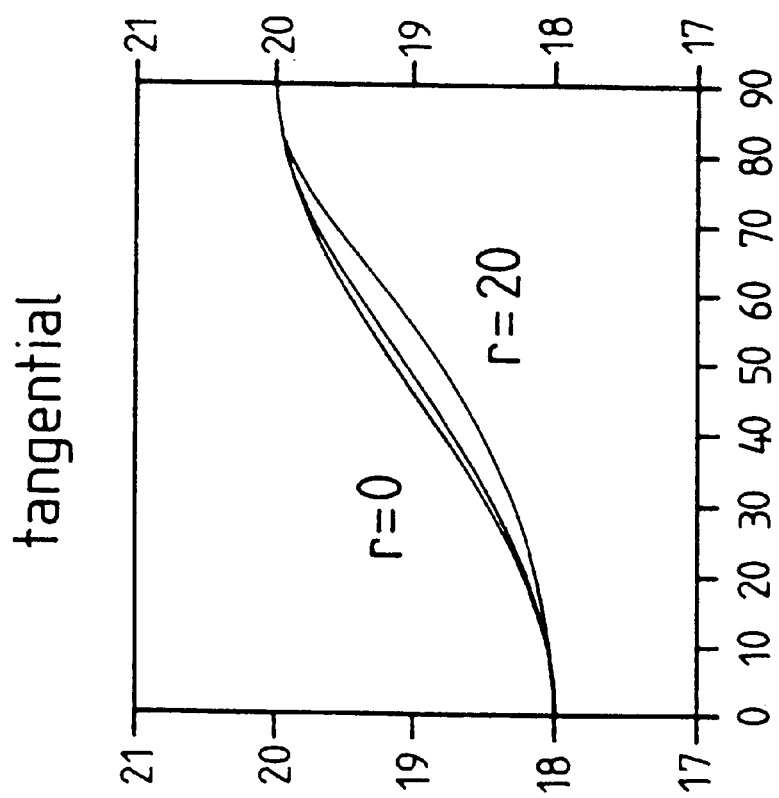

The values of R(0) and R(90) are fixed by the desired tangential powers and the powers at intermediate angles are determined by interpolating between these end values. A form for the interpolation comes from the recognition that the form of the above power profiles are nearly sinusoidal. So a good first approximation for the R(θ) would be $$P(\theta)=P(0)+(P(90)-P(0))(1+\cos2\theta)/2, \text{ and } R(\theta)=(n-1)/P(\theta)$$

where P is the tangential power and n is the index of refraction needed to convert power to curvature. To add more control over the sagittal behavior, more Fourier terms could be added to the interpolation. For more control over the tangential behavior the power could be made polynominal in r. For a simple surface no extra degrees of freedom would be required. The plots of FIG. 13 show the tangential and sagittal powers as a function of angle as shown above for the torics. Notice that the tangential errors at intermediate angles are less than the donut and greater than the barrel torics. Notice also that the sagittal power is correct at 0 and 90 for r=0 but starts missing on both meridia, more or less symmetrically, as the radius increases. For a surface that is not axially symmetric there is a weak contribution from the angular behavior on the tangential curvature. This is because the normal vector is not in the same plane as the circular cross section.

Another way to produce an "unbiased" cyl correction surface is to average the conventional donut and barrel torics together. Doing this gives results that are similar to those for the surface constructed from circular meridians. The angular plots for the averaged torics are shown in FIG. 14 in which $z=a_B Z_B+(1-a_B)Z_D$ where Z is the surface height of the lens, $Z_B$ is the surface height of a conventional barrel toric; $Z_D$ is the surface height of a conventional donut toric; and $a_B$ is a weighting factor such that $1>a_B>0$. FIG. 14 shows the specific case for $a_B=0.5$.

Figure 15:
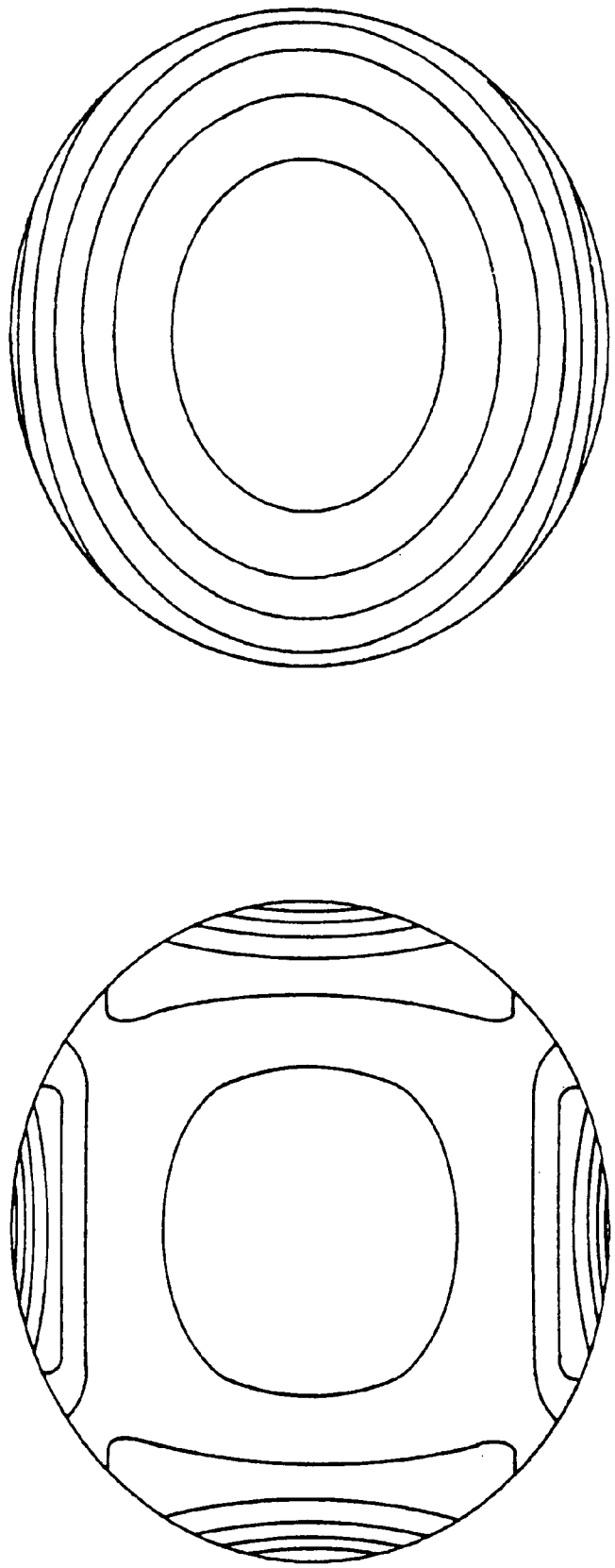
FIGS. 15 and 16 are contour plots of surface astigmatism for lens element surfaces employing the teachings of the present invention.

It is difficult to tell from the plots of FIG. 14, but there are significant differences in the angular behavior of the tangential and sagittal powers for these circular meridia and averaged toric surfaces. The contour plots of FIG. 15 compare the surface astigmatism of the averaged torics and the circular meridian functions. The plots have the same 0.1 diopter contours and 45 mm diameters as before.

Figure 16:
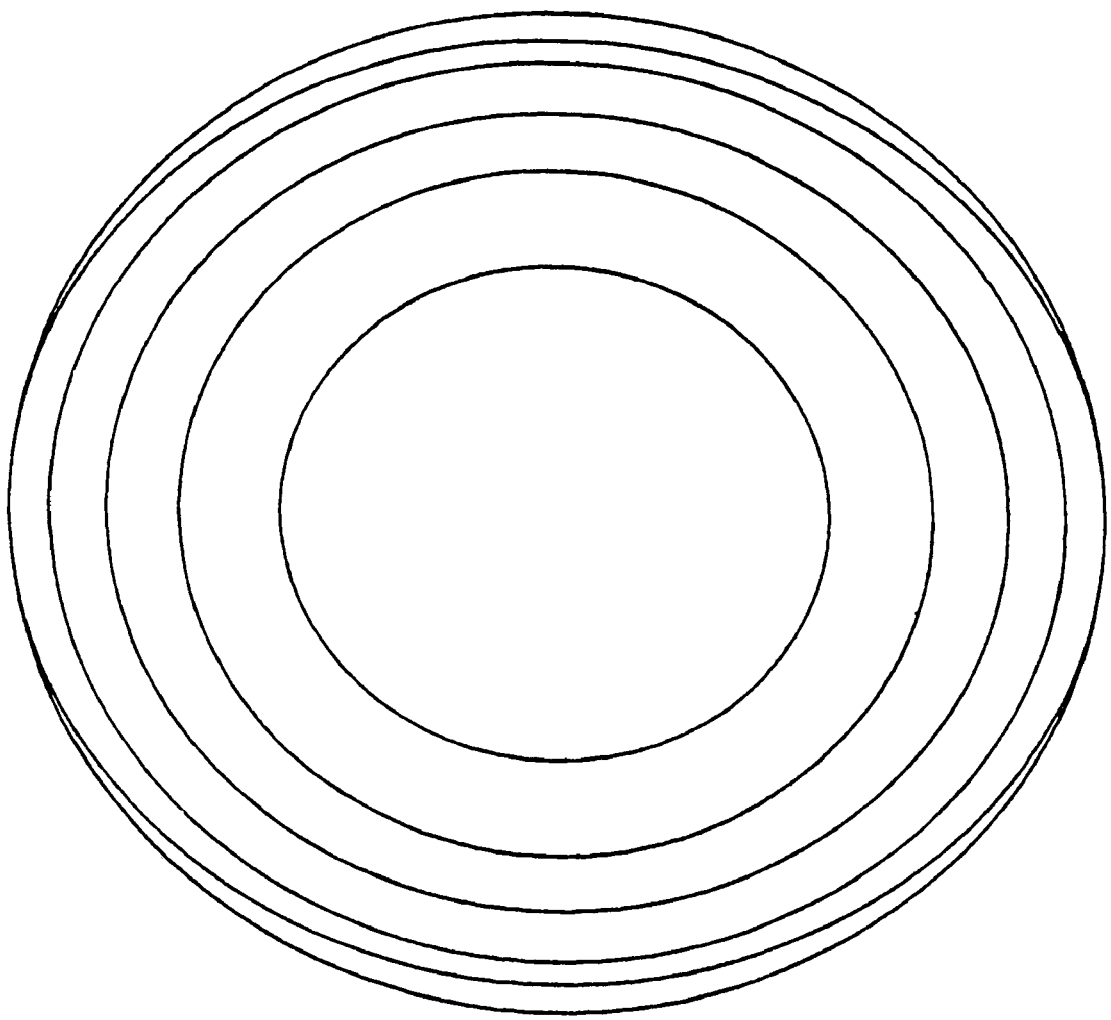

The astigmatism behaves more simply for the circular meridian surface than for the averaged torics. To show the effect of adding Fourier terms to the angular interpolation, one extra coefficient can be adjusted to "round out" the elliptical looking contours. The results are shown in FIG. 16. Note that the meridians still all have circular cross sections, only the angular interpolation has been changed slightly.

The circular meridia and average toric surfaces have additional properties of note. The surface astigmatism of the surface at any point off the principle meridia is less than the larger of the surface astigmatism of the barrel toric or the donut toric at the same point. In addition, the average toric or circular meridia surfaces lie between (have an intermediate Z value) between the barrel toric and the donut toric of the same prescription.

While the foregoing torics are preferred for use as back surfaces for lenses of preferred embodiments of the present invention, it is possible to use conventional torics or generalized torics to provide for the lens.

Alternatively surface correction for lens elements of the present invention may be provided by producing a back surface in accordance with the following mathematical description of a symmetric polynomial:

$$z = \sum_{k=0,2...}^{n} \sum_{j=0,2...}^{k} C_{k-j,j} x^{k-j} y^j;$$

A number of measures of optical aberrations of a lens are defined as follows:

$$\text{Mean Power Error (MPE)} = \frac{\varepsilon_{11} + \varepsilon_{22}}{2}$$

$$\text{Cyl Error} = ((\varepsilon_{11} - \varepsilon_{22})^2 + 4\varepsilon_{12}^2))^{1/2}$$

-continued $$\text{RMS Power Error (RMS blur)} = \left(\frac{\varepsilon_{11}^2 + 2\varepsilon_{12}^2 + \varepsilon_{22}^2}{2}\right)^{1/2}$$

$$= \left((\text{mpe})^2 + \frac{1}{4}(\text{cyl error})^2\right)^{1/2}$$

where $\epsilon$ is the focal error matrix and may be written $$\varepsilon = \begin{pmatrix} \varepsilon_{11} & \varepsilon_{12} \\ \varepsilon_{21} & \varepsilon_{22} \end{pmatrix}$$

where $\epsilon_{12}=\epsilon_{21}$ by the choice of the orthonormal basis set.

Where these terms are calculated by considering specifically the optical properties of the lens, the terms Optical Mean Power Error, Optical Cyl Error and RMS Optical Power Error apply.

The merit function(s) may be selected from the following functions depending on the specific application of the optimized lens:

$$M_1 = \sum_\theta (\text{rms blur})_\theta^2$$

$$M_2 = \sum_\theta ((\text{mpe})^2 + (\text{cyl error})^2)_\theta$$

$$M_3 = \sum_\theta \left(\frac{1}{16}(\text{mpe})^2 + (\text{cyl error})^2\right)_\theta$$

$$M_4 = \sum_\theta^{horizontal} (\varepsilon_{11})_\theta^2 + \sum_\theta^{vertical} (\varepsilon_{22})_\theta^2 + \sum_\theta^{oblique} (\text{mpe})_\theta^2$$

$$M_5 = \sum_\theta \left((\text{mpe})^2 + \frac{1}{16}(\text{cyl error})^2\right)_\theta$$

where summations are over a number of eye rotations $\theta$.

In the case of $M_4$, there are different blur measures used depending upon whether the sample point $\theta$ represents a horizontal, vertical, or oblique rotation from the "straight ahead" position. This mode may provide some generalization of the aspheric "minimum tangential error" design strategy.

The modes $M_3$ and $M_5$ represent "minimum astigmatic error" and "minimum mean power error" strategies respectively.

In a still further embodiment, a term may be included in the merit function that represents the cosmetics of the lens. For example, instead of using M alone, a modified merit function may be defined by $$M^* = M + \eta_\theta \lambda^2 \left(\frac{V}{\pi r^2}\right)^2$$

where $\eta_\theta$ denotes the number of sample eye rotations $\theta$ considered in M, r is a specified lens radius, and V is the lens volume out to the radius r. The factor $\lambda$ is seen to be weighting on the average lens thickness.

III. Reduction Of Magnification And Distortion

Spectacle lenses either minify or magnify objects viewed through them. This occurs because the principal planes of conventional spectacle lenses are located close to the lens and do not coincide with the entrance pupil of the eye. In general, plus power lenses make things look bigger, and minus power lenses make things look smaller. Magnification also changes the perceived direction of objects in the peripheral field, and causes the apparent field of view to differ from the true field of view through the lens.

In addition to magnification, spectacle lenses also distort the shape of objects viewed through them. For an eye looking straight ahead, minus lenses create so-called "barrel distortion", in which rectangular objects appear compressed in the periphery so that squares look like barrels. Conversely, plus powered lenses create "pincushion distortion", which stretches out the corners of the squares.

The two effects add together to degrade the perception of object size, shapes, and position. Textbooks on ophthalmic optics teach that it is not practical to correct distortion in spectacle lenses, and are silent about the desirability of reducing magnification effects. Yet one of the touted visual advantages of contact lenses is that the close fit of the lens to the eye reduces magnification and distortion effects, allowing a more natural correction of vision. It would seem desirable to reduce the magnification and distortion of spectacle lenses if it is possible.

For a distant object, the magnification effect is defined by the following equation:

$$\text{Relative Spectacle Magnification} = \left(\frac{1}{1-dF_v}\right)\left(\frac{1}{1-\frac{tF_1}{n}}\right)$$

where d ($d_v$ in FIG. 3) is the distance from the back surface of the lens to the entrance pupil of the eye, $F_v$ is the back vertex power in diopters, t is the thickness in meters, n is the index of refraction, and $F_1$ is the front surface power in diopters.

The part of the equation inside the first set of brackets is often called the "Power Factor" because it shows how much magnification is due to the lens power. If d could be equal to zero, then the power factor would be equal to 1. In other words, a lens in contact with the eye would have very little magnification due to its power, and this is what happens with contact lenses. Spectacle lenses are positioned away from the eye to avoid contact with the eye, eyelids, or eyelashes so this term is greater than 1 for plus lenses and less than 1 for minus lenses. In other words, plus power spectacle lenses tend to magnify and minus lenses tend to minify. According to context, the term "magnification effects" are used to describe both magnification and minification.

The part of the equation inside the second set of brackets is usually called the "Shape Factor" because it shows how magnification varies with the thickness and curvature of the lens. If lenses had no thickness, then t would equal zero and this term would be equal to 1. The ideal "thin lens" of third order optics would not have any magnification effect due to shape. Contact lenses come close to approximating this condition because they can be made extremely thin. Spectacle lenses do have a significant thickness to avoid breakage and always have positive front surface curvatures, so this term always is greater than 1. In other words, all positive meniscus spectacle lenses tend to magnify due to their shape.

To eliminate magnification effects, the equation must be set equal to 1, so the product of the power and shape factors must be equal to 1. Since both the power factor and shape factor in plus lenses are each greater than one, their product cannot equal 1, so no plus lens in a positive meniscus form can ever be free from magnification. On the other hand, minus lenses have power factor less than 1 and a shape factor greater than 1, so it is possible to force these factors to cancel.

To do this, we must solve this equation for unit magnification. After doing so we get the following relationship:

$$t = -\frac{ndF_v}{F_1(1-dF_v)} \quad (1)$$

This equation specifies the lens thickness which eliminates spectacle magnification effects. It works by placing the second principal plane of the lens at the entrance pupil of the eye. Achieving this in a practical thickness requires two things: a minus lens power and very steep curves.

Distortion

According to third order theory, distortion can only be eliminated within lenses so steeply curved as to be impracticable. Jalie, M. *The Principles of Ophthalmic Lenses* $4^{th}$ Edition p. 461.

Third Order theory in fact requires back surface curves in excess of 35 Diopters, which would be nearly concentric around the entrance pupil of the eye; such surfaces indeed would be impractical. A truly concentric lens design which has both surfaces concentric around the entrance pupil of the eye would have no distortion at all because the symmetry of the lens would ensure that all bundles of rays from oblique objects would encounter the same surface slopes as do those from central objects. While concentricity about the entrance pupil does require extremely steep curves, we have found that somewhat flatter curves also drastically reduce distortion when they are combined with lenses which have principal planes located close to the entrance pupil. This occurs with lenses designed to reduce minification in minus power lenses, and result in lenses which are more nearly concentric around the centroid of rotation of the eye.

In fact, it is highly desirable to make the lens concentric about the center of rotation of the eye, because this will improve the symmetry of the lens for the eye as it turns to view objects in the peripheral field, resulting in improved resolution. If we strictly require that one surface of the lens be concentric around the centroid of rotation of the eye, we can derive a thickness which virtually eliminates distortion. In this case, a special form of the equation for lens thickness is required.

Figure 1:
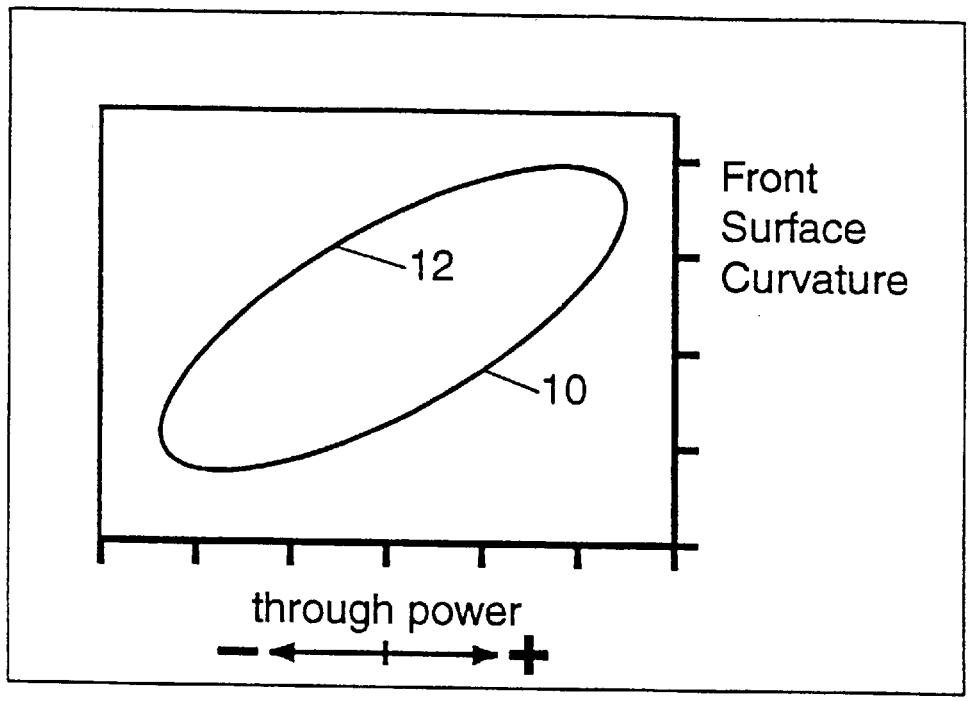
FIG. 1 is a drawing of a Tscherning ellipse.
Figure 2:
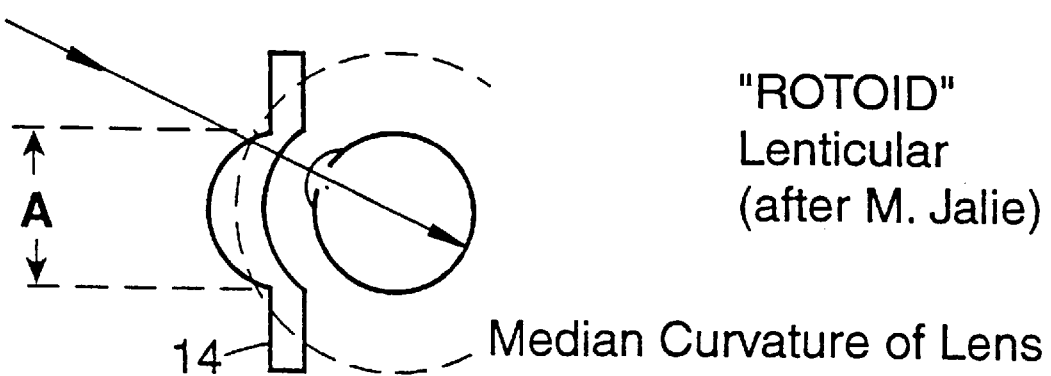
FIG. 2 is a cross-sectional view of a prior art, high plus power "rotoid" lens.
Figure 3:
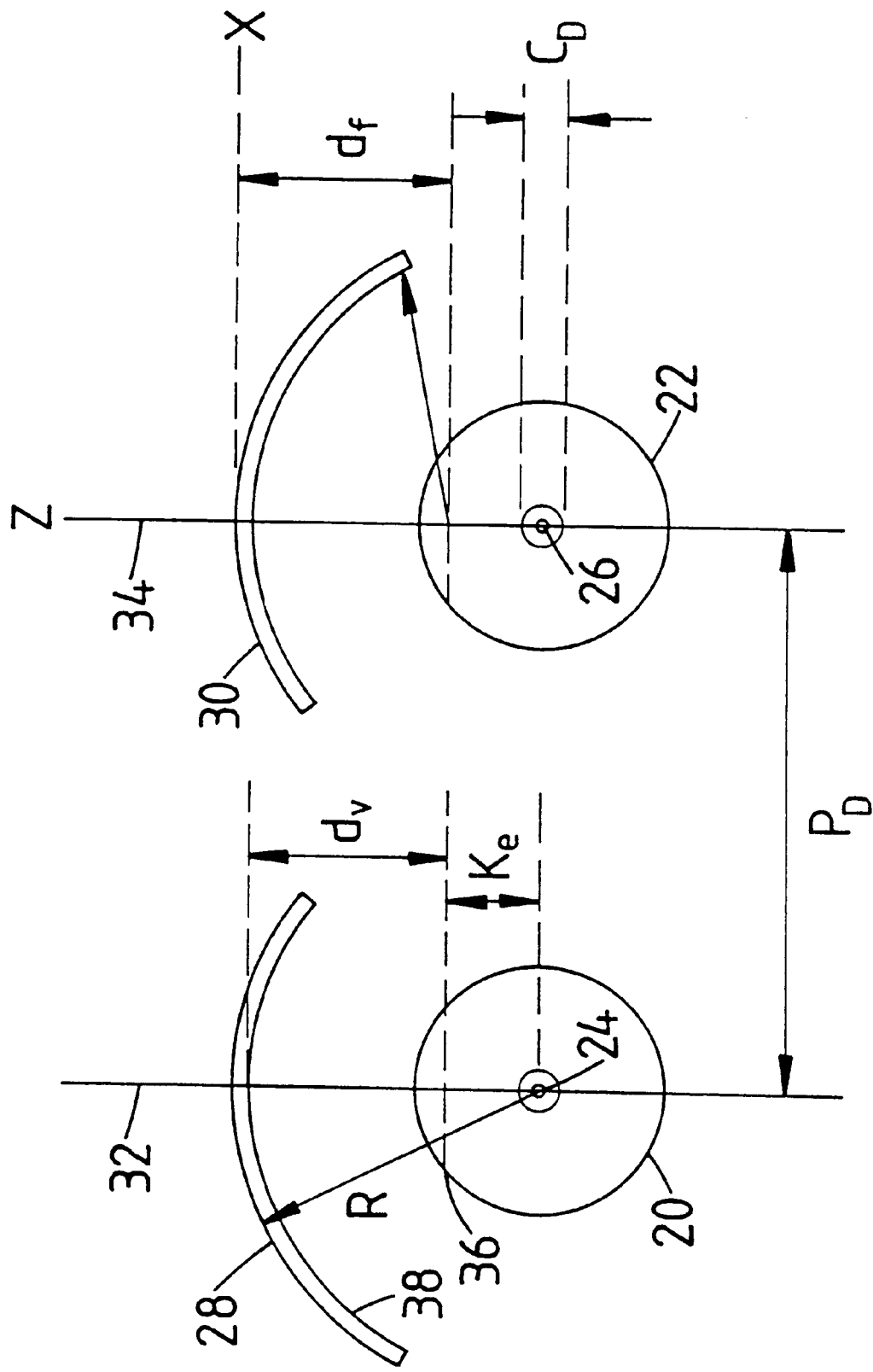
FIG. 3 is a cross-sectional top view of a pair of human eyes, and lenses configured in accordance with a preferred embodiment of the present invention.
Figure 4:
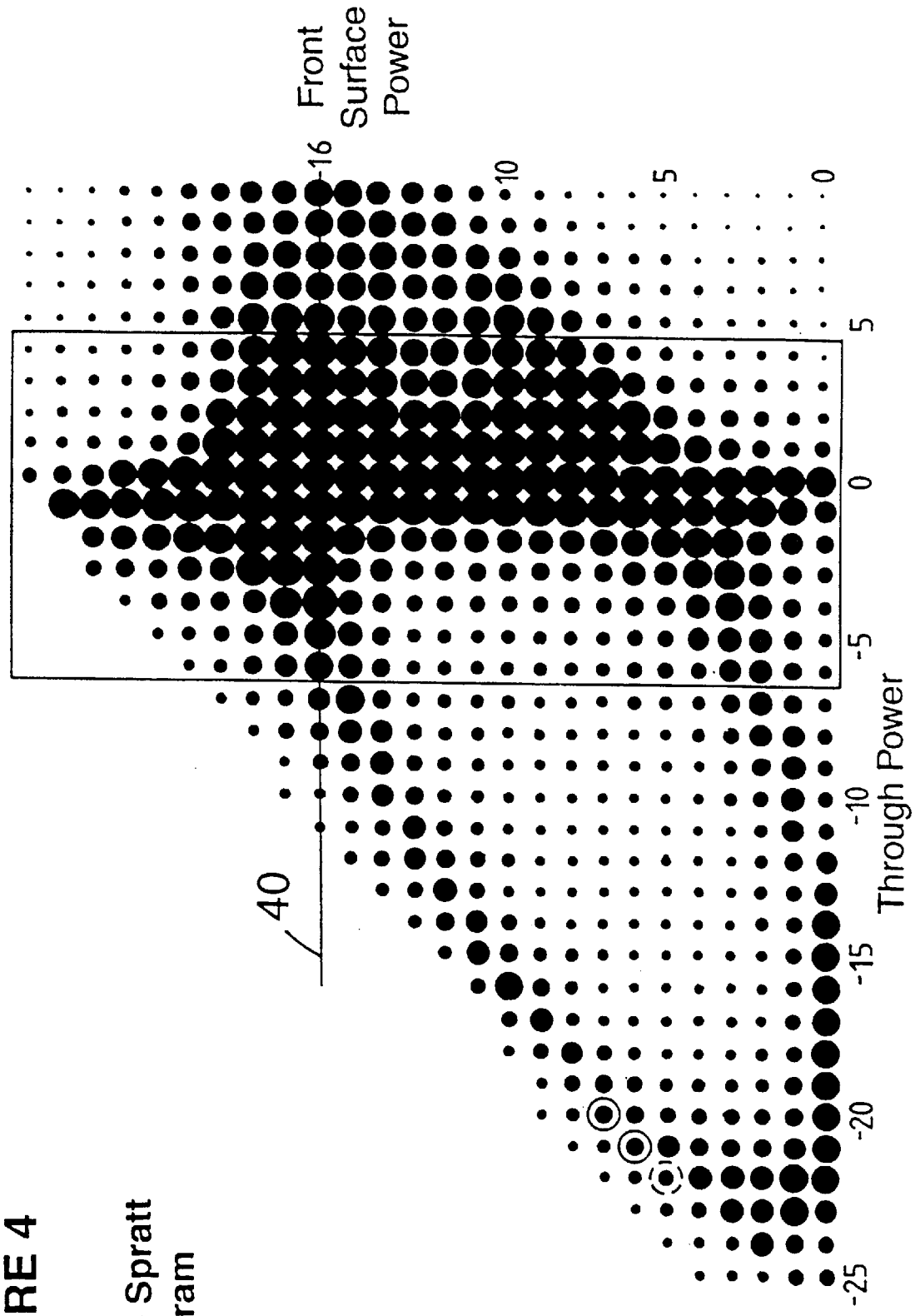
FIG. 4 is a Morris-Spratt diagram illustrating properties of series of lens elements made in accordance with teachings of the present invention.
Figure 5:
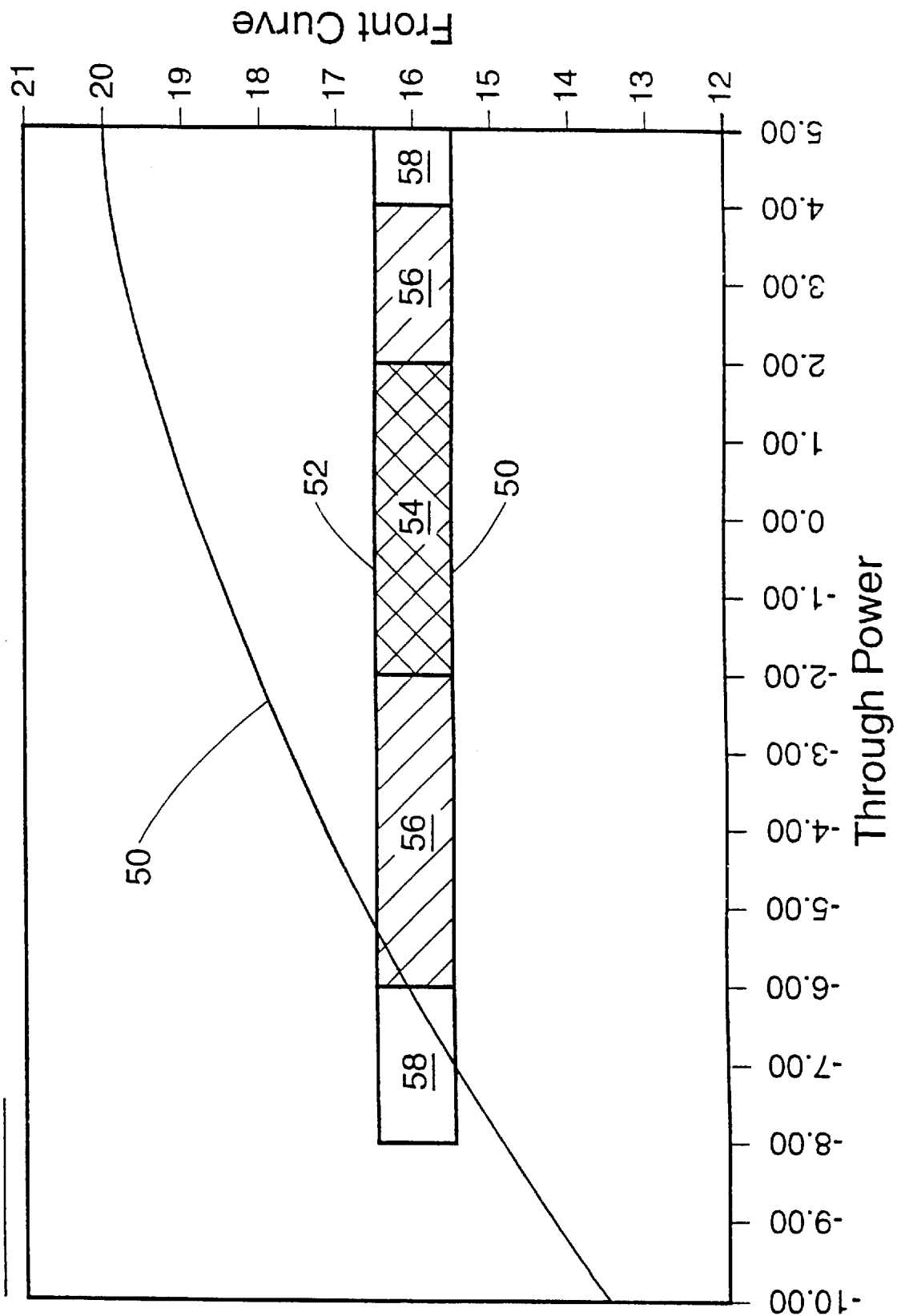
FIG. 5 is a diagram of front curves and through power ranges selected in accordance with the present invention, with a portion of the Tscherning ellipse for this special case, overlaid thereon.

For example, in a lens which has its front surface concentric around the centroid of rotation of the eye, we can solve for t in terms of the radius of the front surface, fitting distance, the index of refraction, the back vertex power, and the distance of the entrance pupil from the center of rotation of the eye. In this case $$t = \frac{[F_v(r_1 - K_e + k_1) - 1] + \sqrt{(F_v(r_1 - K_e + k_1) - 1)^2 - 4F_v^2 d_f k_1}}{2F_v} \quad (2)$$

where $$k_1 = \left(\frac{nr_1}{n-1}\right)$$

is a lens shape factor, $r_1$=radius of front surface; $d_f$=distance from the front lens surface to the plane of the entrance pupil; and $K_e$ is the distance from the center of rotation of the eye to the entrance pupil of the eye as shown in FIG. 3

Figure 17:
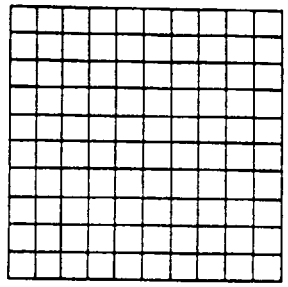
FIGS. 17(a), (b) and (c) illustrate an object grid and images thereof.
Figure 17:
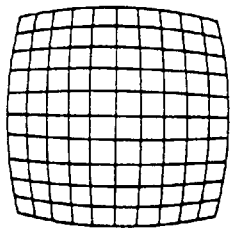
Figure 17:
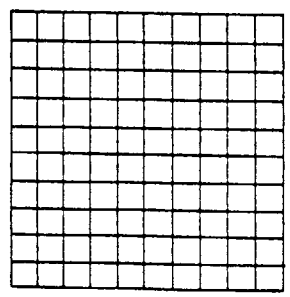

FIGS. 17(a)–(c) show the advantage of this kind of design. FIG. 17(a) is a representation of a large grid to be viewed from a great distance, such that the grid extends 45 degrees to the left and right of the viewer. FIG. 17(b) is a calculated image of what a person wearing a conventional −5.00 D lens would see: the grid appears smaller and distorted in shape. FIG. 17(c) shows the Ha calculated image seen by a person wearing a lens designed to eliminate distortion rid according to the previous equations. The image appears almost identical to the original object.

IV. Lens Manufacture

Ophthalmic lens elements according to the present invention may be formulated from any suitable material. A polymeric material may be used. The polymeric material may be of any suitable type. The polymeric material may include a thermoplastic material such as polycarbonate or thermoset material such as diallyl glycol carbonate type, e.g. CR-39 (PPG Industries) may be used.

The polymeric article may also be formed from cross-linkable polymeric casting compositions, for example as described in U.S. Pat. No. 4,912,155 or U.S. patent application Ser. No. 07/781,392, the entire disclosures of which are incorporated herein by reference.

The polymeric material may include a dye, including, for example, a photochromic dye, which may be added to the monomer formulation used to produce the polymeric material.

The optical lens element according to the present invention may further include standard additional coatings to the front or back surface, including electrochromic coatings. The front lens surface may include an anti-reflective (AR) coating, for example of the type described in U.S. Pat. No. 5,704,692, the entire disclosure of which is incorporated herein by reference. To make sun lenses or to provide a desired cosmetic effect, a partially reflective coating may be applied to the lens. The front lens surface may alternatively or additionally include an abrasion resistant coating, for example of the type described in U.S. Pat. No. 4,954,591, the entire disclosure of which is incorporated herein by reference.

The front and back surfaces may further include one or more surface treatments conventionally used in casting compositions such as inhibitors, dyes including thermochromic and photochromic dyes, for example as described above, polarizing agents, UV stabilizers and materials capable of modifying refractive index.

Figure 18:
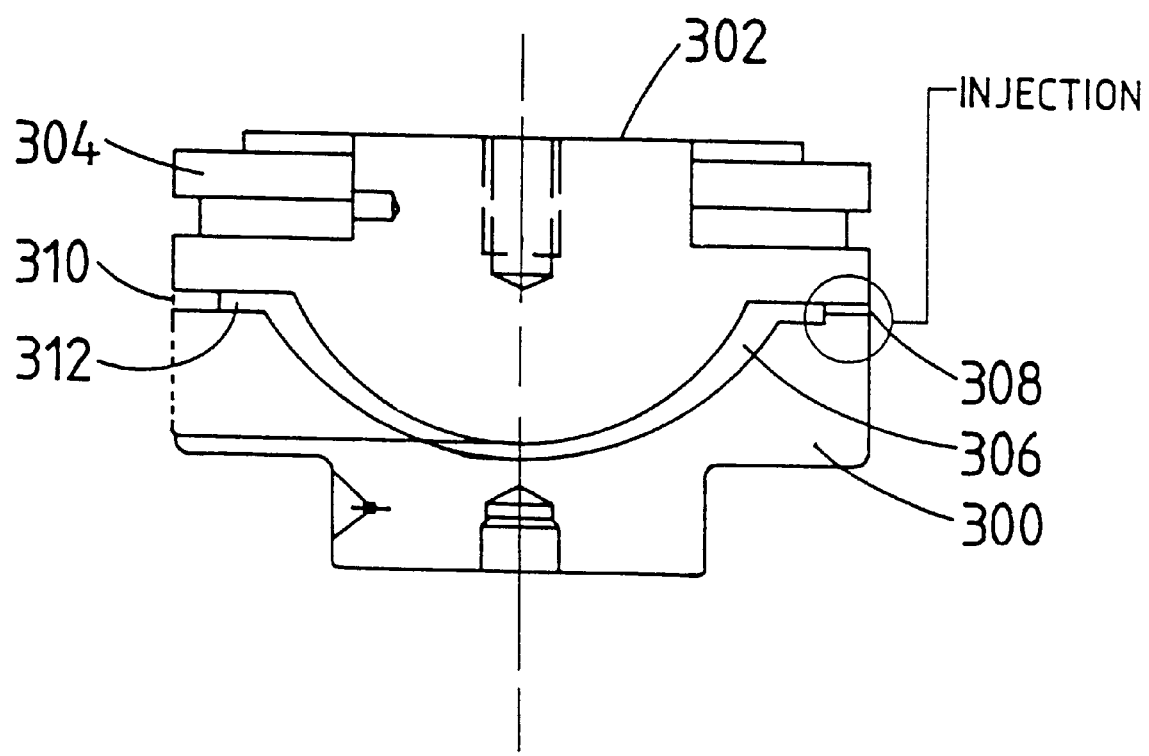
FIG. 18 is a cross-sectional side view of a mold which may be used to make lens elements of embodiments of the present invention.

FIG. 18 illustrates a mold suitable for making a lens element in accordance with teachings of the present invention. The mold includes a front mold portion 300, a back mold portion 302 and closure flange portion 304. The lens element may be formed in the cavity 306 between the mold halves by injecting liquid lens material through port 308. Air escapes through port 310. When the lens element is hard, the mold halves are separated. It will be observed that the lens element as it leaves the mold will have a radial flange 312, which may be removed in later processing.

V. Calculated Performance Of Lens Design Examples

EXAMPLE 1

Table 1 shows a comparison of the calculated performance of a polycarbonate lens made in accordance with the present invention and a conventional low base curve lens.

|  | Concentric form | Conventional |
| --- | --- | --- |
| Index of refraction | 1.586 | 1.586 |
| Power | −3.00 | −3.00 diopters |

-continued

|  | Concentric form | Conventional |
| --- | --- | --- |
| Thickness | 2.0 | 2.0 in mm |
| Front Surface Curvature (1.530 tooling index | 16.00 | 4.00 diopters |
| Front Surface Radius | 33.1 | 132.5 mm |
| Optical power of front surface | 17.7 | 4.4 diopters (higher due to 1.586 index) |
| Paraxial Magnification | 0.97 | 0.96 |
| Apparent field of view | 130 | 105 in degrees, for the edge outline of FIG. 10(a) |
| Optical Values at 30 degree eye rotation: |  |  |
| Distortion | −1.10% | −3.10% |
| Astigmatism | 0.02 | 0.17 diopters |
| Mean Power Error | 0.07 | 0.025 diopters |
| RMS Power Error | 0.07 | 0.09 |
| Chromatic Abberation | 0.11 | 0.16 prism diopters |

EXAMPLE 2

Figure 19:
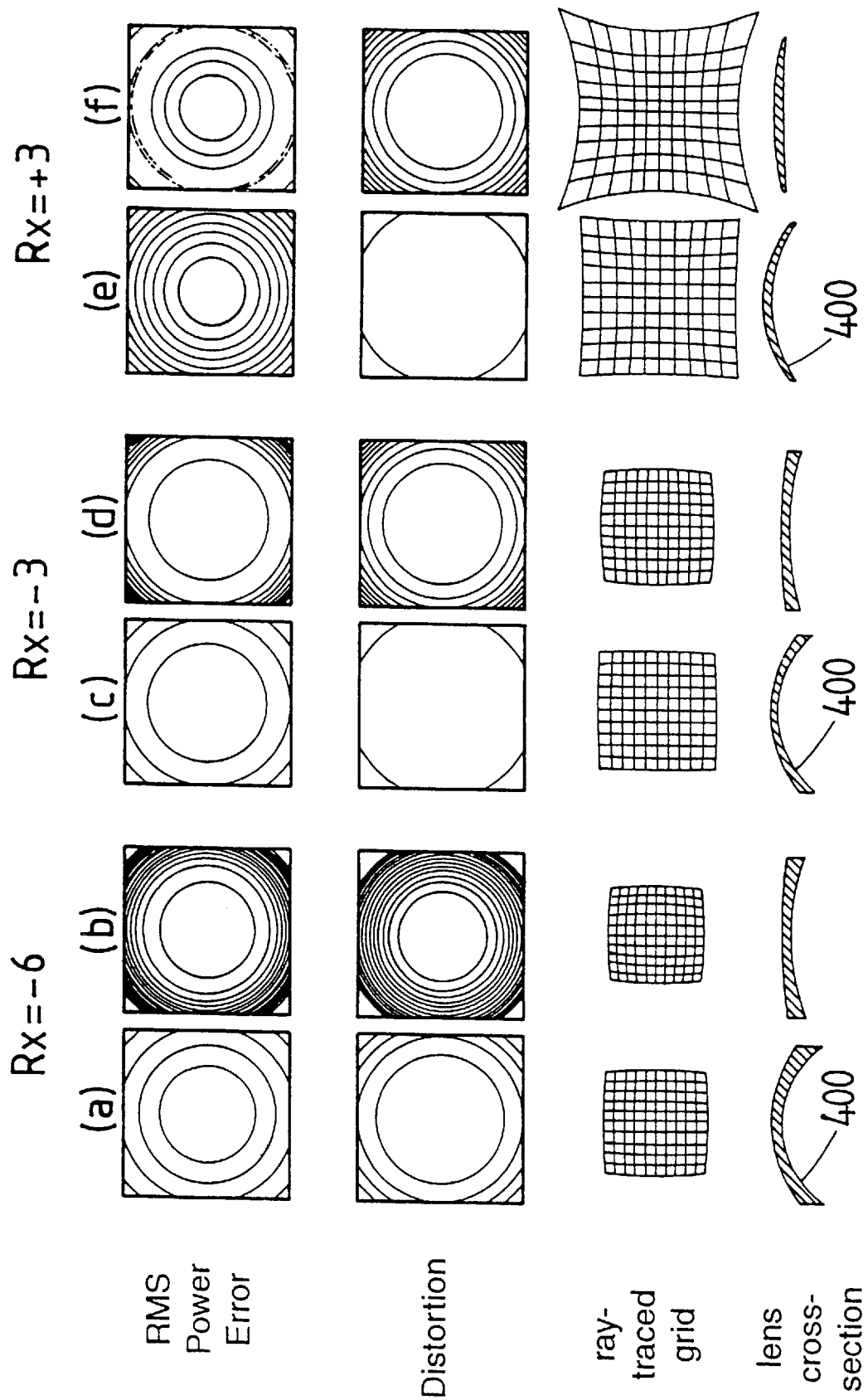
FIGS. 19(a), 19(b), 19(c), 19(d), 19(e) and 19(f) contains plots of RMS power error and distortion and a ray-traced grid calculated for three conventional low base lens and three steeply curved lens elements in accordance with the present invention.

FIG. 19 illustrates a calculated comparison between a series of steeply curved spherical lens elements of −6 D, −3 D and +3 D power [FIGS. 19(a), (c) and (e), respectively] with corresponding low base curve Sola Perma-Poly™ stock lenses [FIGS. 19(b), (d) and (f), respectively].

The steeply curved spherical lens elements have essentially identical, spherical front surfaces of 16 D as shown in the lens cross sections 400. Generally, the steeply curved spherical lens elements provide superior peripheral distortion. The lenses of FIGS. 19(a) and 19(c) also exhibit reduced RMS power error in the minus prescriptions.

EXAMPLE 3

Figure 20:
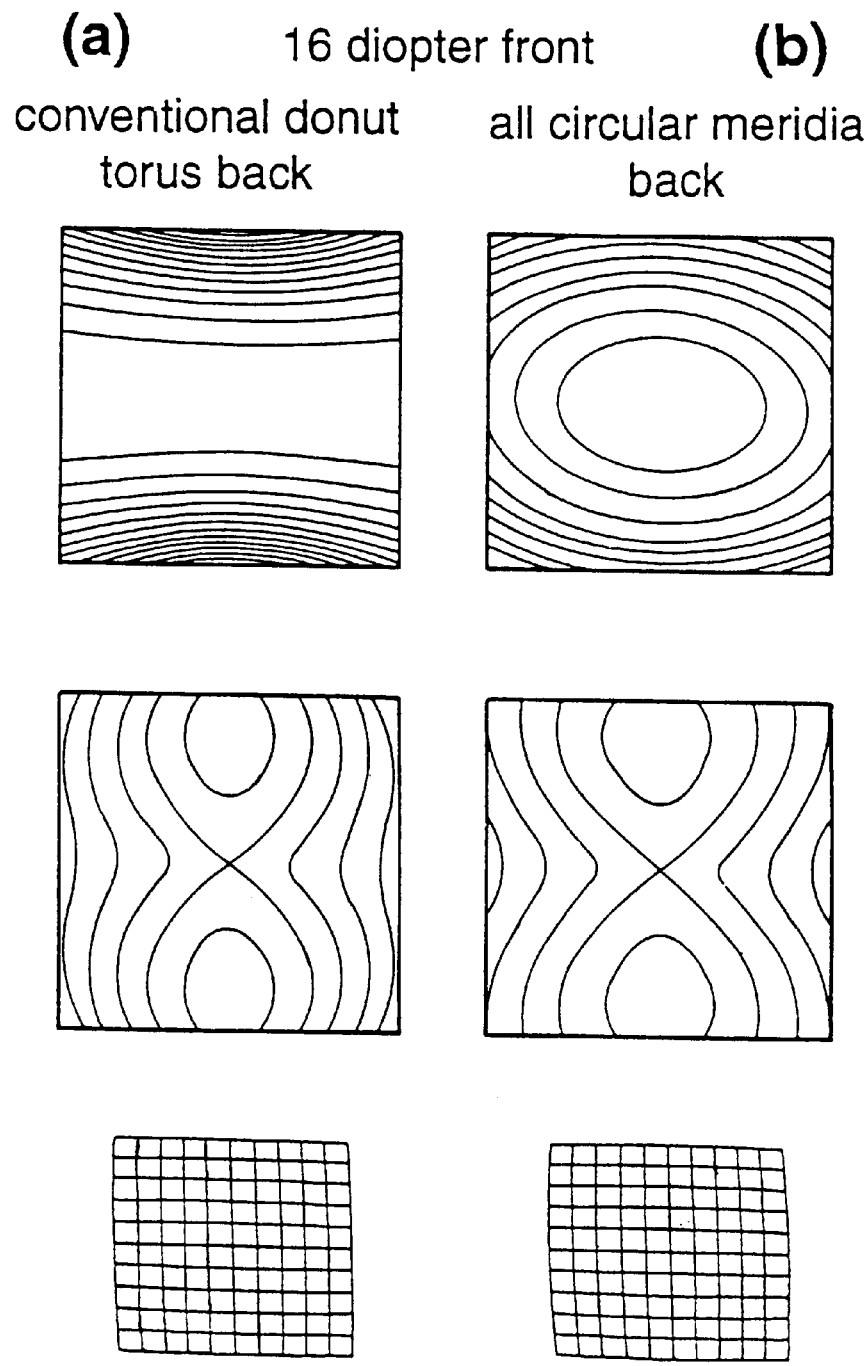
FIGS. 20(a) and (b) contain plots of RMS power error and distortion and a ray-traced grid calculated for a steeply curved lens with a conventional toric back and for an all-circular meridia back.

FIG. 20 illustrates a calculated comparison between two steeply curved spherical lens elements with a 16 D front surface −3 D through power and a back surface cyl correction of −2.

The lens of FIG. 20(a) has a conventional donut torus back; the lens of FIG. 20(b) has an all circular meridia back of the type described above. The latter exhibits superior RMS power error and somewhat improved distortion.

EXAMPLE 4

The final set of examples (FIGS. 21 and 22) are a calculated comparison between a conventional base curve progressive lens and a progressive lens according to the present invention.

FIG. 21 compares distance vision properties of a conventionally curved Sola XL progressive lens, with a lens in which a similar progressive form is placed on a lens element with steeply curved (16 D) base curve.

FIG. 22 compares near vision properties of the Sola XL progressive lens with the steeply curved lens of FIG. 21.

Generally speaking, progressive lenses made in accordance with the present invention are characterized by a steeply curved reference sphere or spherical shell approximately concentric with the centroid of rotation of the wearer in the as worn position. Such lenses have an upper viewing zone for distance vision; lower viewing zone, having a greater power than the upper viewing zone for near vision and an intermediate zone connecting the upper and lower zones, with power varying between the upper and lower zones, including a corridor of relatively low surface astigmatism.

In one embodiment the steeply curved reference sphere corresponds to the front surface of the central part of the upper viewing zone. In another embodiment, the progressive surface is on the front surface of the lens and lies within a steeply curved spherical shell of thickness less than about 2 mm. In both embodiments the radius of curvature of the shell or reference sphere may be less than 50 mm, preferably between 30 and 35 mm, most preferably about 33 mm ± about 2 mm. Suitable front surface designs for progressive lenses are illustrated for example in applicant's patent application Ser. No. 08/782,493 filed Jul. 10, 1997, now U.S. Pat. No. 5,861,535.

VI. Glazed Lenses And Spectacle Frames

Spectacle frames for use in the present invention are adapted to hold lenses of the present invention in the approximate positions shown in FIG. 3. The spectacle frame may be rimless, partial rim or full rim.

In preferred embodiments the lenses, when mounted in the spectacle frame, exhibit essentially no tilt or wrap angle. The spectacle frame may include an adjustable mechanism for altering the positions of the optical axes of the lens to correspond to the axes of straight-ahead vision of the wearer.

Figure 23:
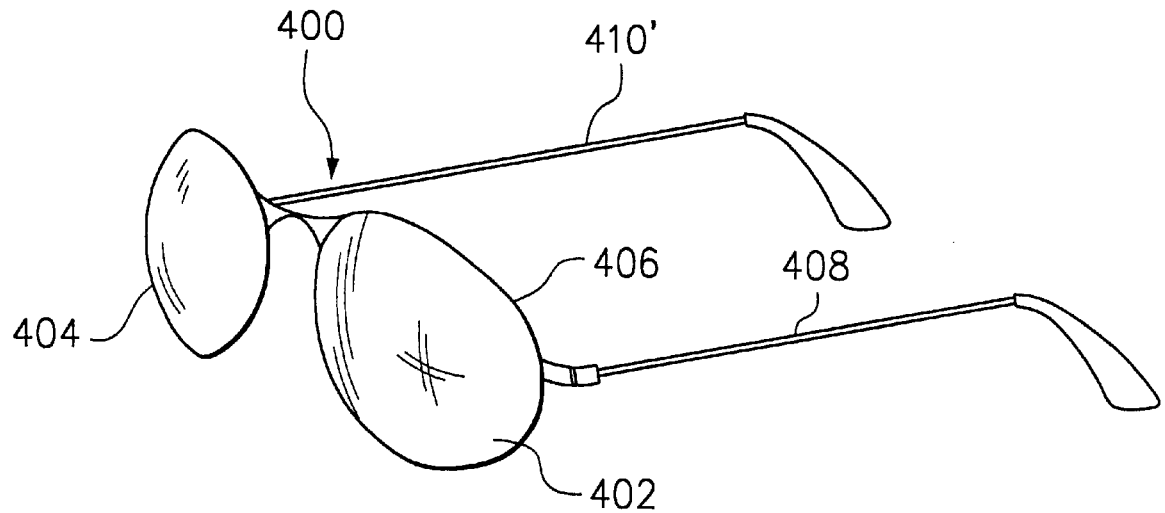

FIG. 23 is a perspective view of eyewear 400 including lenses 402 and 404 and spectacle frames of the present invention. The lens shape creates a cosmetically interesting object. The spectacle frame in FIG. 23 is shown with a rim portion 406 and temple pieces 408 and 410. The rim of the spectacle frame surrounding each lens is adapted to correspond to a closed curve lying on or near the steeply curved reference sphere of the lens. Because of the consistency of this curvature through a range of prescriptions, a single frame or frame design may be fit to any prescription in the range.

Figure 24:
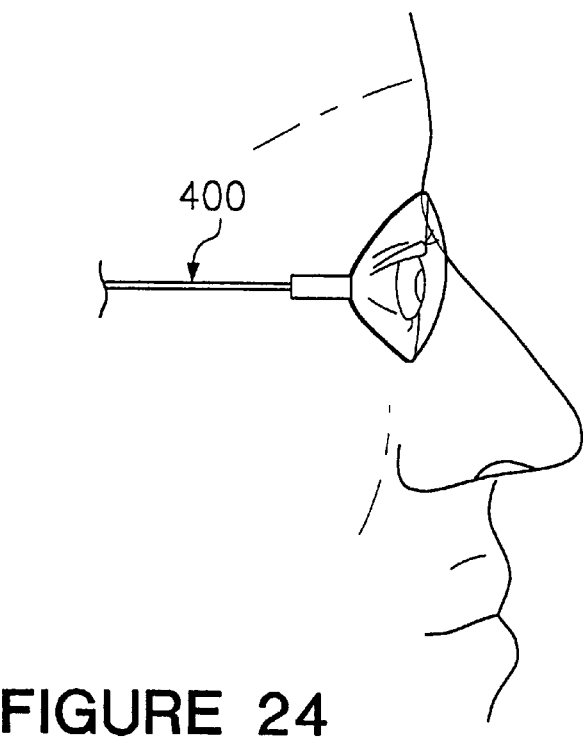

FIG. 24 is a side elevation of the eyewear of FIG. 23 on the face of the wearer. The Figure illustrates another aspect of the visual appearance of the eyewear due to the steep curvature of the lens and the complex three-dimensional shape of the lens edge. The Figure also illustrates that a lens of relatively small size provides a wide field of view and good eye protection.

FIG. 25 is a front pictorial view of eyewear embodiment 412 according to the present invention illustrating certain mechanical aspects of the invention. The spectacle frames of the embodiment of FIG. 25 include a nose bridge 414 and hinged temple pieces 416 and 418. Together these components comprise a three-piece, rimless spectacle frame.

The temple pieces 416 an 418 include hinges 420 and 422, and mounting tabs 424 and 426. In a preferred embodiment, the tabs 424 and 426 are surface mounted onto the spherical front surfaces of the lenses. It will be understood that these mounting surfaces will have a consistent position and angular relation with respect to the frame, regardless of the prescribed through power and cyl correction of the lens. In a similar fashion, tabs 428 and 430 of the nose bridge 414 may be surface mounted on the respective front surface edges of the lens.

The nose bridge 414 is shown in cross-section in FIG. 25(a). Advantageously, the nose bridge may be made an adjustable length to compensate for different pupillary distances ($P_D$ in FIG. 3) commonly found in different wearers. This adjustable feature permits the optical axes of the lenses to be aligned with the axes of vision of both wearer's eyes. One mechanical structure suitable for producing this adjustable feature is shown in FIG. 25(a), it being understood that other combinations of moving or flexible structures could be adapted to the purpose. In the embodiment of FIG. 25(a), the tabs 428 and 430 are each carried by members 432 and 434, respectively, which are inserted into opposite ends of a tube 436. Set screws 438 and 440 hold the members 432 and 434 in position. The set screws may be loosened to permit adjustment of the length of the nose bridge by sliding the members 432 and 434 within the tube to different positions.

Accordingly, novel, high optical quality lens elements with steep spherical curvature are provided with prescribed through-power and cyl correction, and mounted in spectacle frames adapted for use therewith.

The present invention has been described in connection with various embodiments and examples. However, the invention to be protected is defined by the following claims and equivalents thereof recognized in law.

What we claim is:

1. A lens element adapted for mounting in eyewear, the lens element having a non-zero, prescription through power and having at least one spherical surface with a radius of curvature less than about 35 mm, said lens element being adapted for positioning such that a center of curvature of the lens element is located at the centroid of rotation of the eye, wherein the lens element is sufficiently large to provide a field of view greater than 55° in the temporal direction from the forward line of sight.

2. The lens element of claim 1, wherein the lens element is a single vision lens element selected from a series of lens elements having through powers of from at least +2 D to −2 D and approximately the same radius of curvature.

3. A series of ophthalmic lens elements wherein the front surface of the lens is a sphere approximately concentric with the centroid of rotation of the eye in the as worn position; wherein the front surface of each lens element of the series has approximately the same radius of curvature which is essentially a single value selected for the series in the range 25 to 50 mm ± about 1 mm; and wherein the lens elements in the series have various common positive and negative prescription through powers.

4. The series of ophthalmic lens elements of claim 3, wherein lens elements of the series include at least one lens element with a through power of +2 D.

5. The series of ophthalmic lens elements of claim 3, wherein lens elements in the series are lens blanks or edged lenses having a back surface configured such that a prescribed astigmatism correction is provided.

6. The series of ophthalmic lens elements of claim 5, wherein the back surface lies between a barrel toroid and a donut toroid, both having the same principle meridia and the same power along said principle meridia.

7. The series of ophthalmic lens elements of claim 6, wherein the surface astigmatism of said back surface at any point off the principle meridia is less than the larger of the surface astigmatism of the barrel toroid or the donut toroid at the same point.

8. The series of ophthalmic lens elements of claim 5, wherein the back surface is defined such that the surface height Z of the lens element from a fronto-parallel plane at any point on the back surface is a linear combination of the height of a barrel toroid, $Z_B$, and the height of the donut toroid, $Z_D$, Z being bounded by the values of $Z_B$ and $Z_D$.

9. The series of ophthalmic lens elements of claim 8, wherein the barrel toroid and the donut toroid each have principal meridia defined by a cyl prescription of the wearer.

10. The series of ophthalmic lens elements of claim 5, wherein the cross-section of the back surface of the lens element along any meridian is circular.

11. The series of ophthalmic lens elements of claim 10, wherein the curvature of each circular meridian is equal to the instantaneous curvature of a corresponding meridian at the center of a conventional torus given by the prescription.

12. The series of ophthalmic lens elements of claim 10, wherein the back surface astigmatism correction is given by the surface height function z (r, θ) where $$z(r, \theta) = R(\theta) - \sqrt{R(\theta)^2 - r^2},$$

and where $$R(\theta) = \frac{R(0)R(90)}{R(0)\sin^2\theta + R(90)\cos^2\theta}$$

is the radius of curvature along the θ meridian $$r = \sqrt{x^2 + y^2},$$

and the values R(0) and R(90) are the radii of curvature along the principle meridia.

13. The series of ophthalmic lens elements of claim 5, wherein the back surface, together with the front surface, provides a non-zero through power and the back surface being defined by the equation:

$$z = \sum_{k=0,2...}^{n} \sum_{j=0,2...}^{k} C_{k-j,j} x^{k-j} y^j.$$

14. The series of ophthalmic lens elements of claim 4, wherein the lens elements of the series include at least one lens element with a power of −2 D.

15. An ophthalmic lens element having at least one surface which lies within a spherical shell defined by two concentric spheres having radii whose lengths differ by no more than 2 mm, the smaller of the radii being no more than 50 mm in length and wherein at least two points O and Q on the edge of the surface subtend an angle OPQ greater than 80° with respect to a center of the shell P.

16. The ophthalmic lens element of claim 15, wherein the smaller of the radii is between 25 and 35 mm.

17. The ophthalmic lens element of claim 15, wherein the at least one surface has a radius of about 33 mm ± about 2 mm.

18. The ophthalmic lens element of claim 15, wherein the difference in length of the radii is about 0.1 mm or less.

19. The ophthalmic lens element according to claim 15, wherein the angle OPQ is greater than 90°.

20. The ophthalmic lens element according to claim 15, wherein the angle OPQ is greater than 100°.

21. The ophthalmic lens element of claim 15, wherein the at least one surface is the front surface of the lens element, and the rear surface is configured so that the lens element has a selected through power of +4 D to −6 D and a selected astigmatic correction.

22. The ophthalmic lens element of claim 15, wherein the lens element is mounted in eyewear so that the center of the shell is located approximately at the centroid of rotation of the eye when the eyewear is worn.

23. The lens element of claim 15, such that for foveal vision the RMS Power Error is less than ⅜ D for eye rotation angles less than 30°.

24. The lens element of claim 15, such that for foveal vision the RMS Power Error is less than ½ D for eye rotation angles less than 40°.

25. The lens element of claim 15, such that for foveal vision the RMS Power Error is less than ¾ D for eye rotation angles greater than 40° less than 50°.

26. The lens element of claim 15, such that for peripheral vision where the eye is rotated and fixated at an angle of 30° temporally the RMS Power Error is less than ⅜ D for angles ±5° of the fixed position.

27. The lens element of claim 15, such that for peripheral vision where the eye is rotated and fixated at an angle of 30° temporally the RMS Power Error is less than 0.65 D for angles ∓10° of the fixed position.

28. The lens element of claim 15, such that for peripheral vision where the eye is rotated and fixated at an angle of 30° temporally the RMS Power Error is less than 1.0 D for angles ±30° of the fixated position.

29. The ophthalmic lens element of claim 15, wherein the ophthalmic lens element has a selected through power between +2 D and −2 D.

30. The ophthalmic lens element of claim 15, wherein the ophthalmic lens element is mounted in a spectacle frame supported on the face by a nose piece and temple pieces.

31. Prescription eyeglasses wherein refractive through power is provided by two ophthalmic lenses and wherein each lens will contain a sphere extending to edges of the lens having average radii of no more than 35 mm centered approximately in the centroid of rotation of the respective eye, and each lens having a maximum hollow depth of at least 8 mm.

32. The eyewear of claim 31, wherein the maximum hollow depth of each lens is at least 10 mm.

33. The eyewear of claim 31, wherein the front surface of each lens is generally spherical with a radius of curvature of no more than 35 mm and the rear surface is configured so that the lenses have selected through power of at least +4 D to −6 D and selected astigmatic correction.

34. The eyewear of claim 31, wherein the eyewear further comprises a frame and wherein each lens is selected from a series of lenses having commonly prescribed through power and astigmatic corrections and wherein the radius of curvature of each element in the series is sufficiently similar to allow use of any element in the series in the same spectacle frame.

35. The eyewear of claim 31, wherein the radius of curvature of both lenses is about 33 mm.

36. A series of minus power ophthalmic lens elements having at least one surface which lies within a spherical shell of a thickness no greater than 2 mm and a radius of no more than 50 mm, the lens elements in the series having thickness at their geometric centers which increase with the magnitude of the absolute value of power.

37. The lens series of claim 36, wherein the element has a thickness t at its center given by the function $$t = -\frac{ndF_v}{F_1(1 - dF_v)}$$

wherein n is the index of refraction of the lens material, d is the distance from the lens back surface to the entrance pupil of the eye, $F_v$ is the back vertex power and $F_1$ is the front surface optical power defined as $$F_1 = \left(\frac{n-1}{r}\right).$$

38. Prescription eyewear including a lens having a generally spherical curvature with a radius of no more than 35 mm approximately centered on the centroid of rotation of the eye wherein the lens extends horizontally from the nasal margins of the orbital region to the temporal margins of the orbital region, said lens having a concave rear surface which clears the eye lashes and a through power from the temporal to nasal edge of the lens varying by no more than 0.5 D from a positive or negative prescription power.

39. A method of providing prescription eyewear comprising the steps of
  providing a lens element having
    a front surface which lies within a spherical shell of a thickness no greater than 2 mm and a radius of no more than 35 mm; and
    a rear surface configured so that the lens element has a prescribed through power and a prescribed astigmatism correction; and
  positioning the lens element on the wearer so that the center of the spherical shell lies approximately at the centroid of rotation of the eye.

40. The method of claim 39, wherein the lens element is positioned by glazing the lens element into a frame having a standard aperture corresponding to a radius of a spherical shell common to a series of lens elements having different through power, including the prescribed through power.

41. The method of claim 40, wherein the lens element is provided with a back surface being defined by a surface which has a circular cross section along any meridian passing through its origin, and whose curvatures along those meridia are identical to the central curvatures of the equivalent conventional toric.

42. A spectacle frame suitable for use with a series of ophthalmic lenses, each of the lenses having a spherical surface of radius R between 25 and 35 mm, each lens in the series having the same value of R, and a second surface selected to provide, in conjunction with the spherical surface, a range of common prescriptions, said frame supporting left and right lenses in the as worn position so that the centers of the spherical surfaces are located approximately at the centroids of the left and right eyes, respectively the frame comprising temple pieces and rim portions for engaging the left and right lenses, wherein the rim portion engaging each lens is formed in the shape of a closed curve lying on the surface of a sphere having a radius approximately equal to the radius of said spherical surface.

43. The spectacle frame of claim 42, wherein the nasal-most point and temporal-most point of the closed curve subtend an arc of greater than 90° with a vertex at the center of the spherical surface.

44. The spectacle frame of claim 42, comprising a left temple piece, a right temple piece and a nose bridge.

45. The spectacle frame of claim 44, wherein the nose bridge is of adjustable length to allow horizontal adjustment of the lens separation to position the centers of the spherical surfaces at the centroids of the eyes.

46. The spectacle frame of claim 44, further comprising hinges for supporting said temple pieces, said hinges being adapted for attachment to the spherical surface at the temporal edges of the respective lens.

47. Eyeglasses comprising:
  left and right lenses each having a spherical front surface with the same radius of curvature between about 31 mm and 35 mm; and
  eyeglass frames including left and right temple pieces and a nose bridge for supporting the lenses on the face of a wearer, so that the center of the spherical front surface of each of the left and right lenses is located approximately on the centroid of rotation of the left and right eye, respectively.

48. The eyeglasses of claim 47, wherein the eyeglass frame is rim less.

49. The eyeglasses of claim 47, wherein the eyeglass frame further comprises rim portions engaging each lens, each rim portion being formed in the shape of a closed curve lying on the surface of a sphere having a radius approximately equal to a radius of curvature of the front surface of the lens held by the rim portion.

50. The eyeglasses of claim 47, wherein at least one of the lenses has a positive through power greater than 0.5 D.

51. The eyeglasses of claim 47, wherein at least one of the lenses has a negative through power greater of a magnitude greater than 0.5 D.

52. The eyeglasses of claim 47, wherein the lenses are tinted.

53. Eyeglasses comprising
  left and right prescription lenses selected from a series of lenses having non-zero through power and each having a spherical surface of the same radius R, R being a value between 25 and 50 mm; and
  eyeglass frames including left and right temples pieces and a nose bridge for supporting the lenses on the face of a wearer, so that the center of the spherical surface of each of the left and right lenses is located approximately on the centroid of rotation of the left and right eye, respectively.

54. The eyeglasses of claim 53, wherein the radius R is less than about 35 mm.

* * * * *